US012155212B2

(12) United States Patent
Kouno et al.

(10) Patent No.: US 12,155,212 B2
(45) Date of Patent: Nov. 26, 2024

(54) POWER CONTROL SYSTEM AND DEVICE

(71) Applicant: DAIKIN INDUSTRIES, LTD., Osaka (JP)

(72) Inventors: Masaki Kouno, Osaka (JP); Reiji Kawashima, Osaka (JP); Keisuke Ohta, Osaka (JP); Hiroki Kojima, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/027,048

(22) PCT Filed: Sep. 21, 2021

(86) PCT No.: PCT/JP2021/034654
§ 371 (c)(1),
(2) Date: Mar. 17, 2023

(87) PCT Pub. No.: WO2022/071036
PCT Pub. Date: Apr. 7, 2022

(65) Prior Publication Data
US 2023/0327442 A1    Oct. 12, 2023

(30) Foreign Application Priority Data

Sep. 30, 2020  (JP) ................................. 2020-164994

(51) Int. Cl.
*H02J 3/01* (2006.01)
(52) U.S. Cl.
CPC ...................................... *H02J 3/01* (2013.01)
(58) Field of Classification Search
None
See application file for complete search history.

(56) References Cited

U.S. PATENT DOCUMENTS

| | | | |
|---|---|---|---|
| 4,835,411 A | 5/1989 | Takeda | |
| 11,322,939 B1 * | 5/2022 | Spano, Sr. | ................ H02J 3/18 |

(Continued)

FOREIGN PATENT DOCUMENTS

| | | |
|---|---|---|
| CN | 111193264 A | 5/2020 |
| JP | 2004-336870 A | 11/2004 |

OTHER PUBLICATIONS

International Search Report for PCT/JP2021/034654 (PCT/ISA/210) mailed on Oct. 26, 2021.

(Continued)

*Primary Examiner* — Jared Fureman
*Assistant Examiner* — Esayas G Yeshaw
(74) *Attorney, Agent, or Firm* — Birch, Stewart, Kolasch & Birch, LLP

(57) ABSTRACT

[Problem to be solved] To achieve adjustment of an electric line based on indexes set separately for harmonic components having different orders in a current in the electric line. [Solution] A power control system causes a device to adjust apparent power in an electric line, and the power control system includes a setting unit that sets an index regarding each adjustment for a harmonic component of a first order group in a current in the electric line, a harmonic component of a second order group higher in order than the first order group in the current in the electric line, and a fundamental component in the current in the electric line, and a control unit that controls each adjustment by the device based on the index set by the setting unit.

10 Claims, 9 Drawing Sheets

(56) References Cited

U.S. PATENT DOCUMENTS

| | | | |
|---|---|---|---|
| 2018/0278089 A1* | 9/2018 | Fick | G05B 19/0428 |
| 2018/0366978 A1* | 12/2018 | Matan | G06Q 50/06 |
| 2021/0131400 A1* | 5/2021 | He | G05B 23/0283 |
| 2023/0074022 A1* | 3/2023 | Zhou | H02M 1/4258 |

OTHER PUBLICATIONS

Extended European Search Report for European Application No. 21875338.2, dated Mar. 13, 2024.

* cited by examiner

FIG.5

| ELECTRIC LINE | POWER INFORMATION | THRE-SHOLD |
|---|---|---|
| 14A | P1 | T1 |
| 14B | P2 | T2 |
| 17A | P3 | T3 |
| 17B | P4 | T4 |
| 202A | P5 | T5 |
| 202B | P6 | T6 |
| 202C | P7 | T7 |
| 202D | P8 | T8 |

FIG.6

| | ELECTRIC LINE | | | | | | | | | | | |
|---|---|---|---|---|---|---|---|---|---|---|---|---|
| | 14 | | | | 17 | | | | | 202 | | |
| | LOW-ORDER GROUP HARMONIC | | FUNDAMENTAL | | LOW-ORDER GROUP HARMONIC | | FUNDAMENTAL | | LOW-ORDER GROUP HARMONIC | HIGH-ORDER GROUP HARMONIC | FUNDAMENTAL | |
| ADJUST-MENT TARGET | ADJUST-MENT NEEDED ORDER | OTHER ORDERS | ADJUST-MENT NEEDED POWER FACTOR | OTHER POWER FACTORS | ADJUST-MENT NEEDED ORDER | OTHER ORDERS | ADJUST-MENT NEEDED POWER FACTOR | OTHER POWER FACTORS | | | ADJUST-MENT NEEDED POWER FACTOR | OTHER POWER FACTORS |
| PRIORITY ORDER | 1 | 4 | 3 | 5 | 6 | 8 | 7 | 9 | 11 | 2 | 10 | 12 |

FIG.7

| HPS | PASS-THROUGH ELECTRIC LINE | | ADJUST-ABLE AMOUNT |
|---|---|---|---|
| | RECEPTION-SIDE DISTRIBUTION LINE | IN-FACILITY ELECTRIC LINE | |
| 21A | 17A | 202A | 10 |
| 21B | 17A | 202A | 10 |
| 21C | 17A | 202A | 10 |
| 21D | 17A | 202B | 10 |
| 21E | 17A | 202B | 10 |
| 21F | 17A | 202B | 10 |
| 21G | 17B | 202C | 10 |
| 21H | 17B | 202C | 10 |
| 21I | 17B | 202C | 10 |
| 21J | 17B | 202D | 10 |
| 21K | 17B | 202D | 10 |
| 21L | 17B | 202D | 10 |

FIG.9

| | ELECTRIC LINE | | | | | | | | | | | | |
|---|---|---|---|---|---|---|---|---|---|---|---|---|---|
| | 14 | | | | 17 | | | | 202 | | | |
| | LOW-ORDER GROUP HARMONIC | | FUNDAMENTAL | | LOW-ORDER GROUP HARMONIC | | FUNDAMENTAL | | LOW-ORDER GROUP HARMONIC | | HIGH-ORDER GROUP HARMONIC | FUNDAMENTAL |
| ADJUSTMENT TARGET | ADJUSTMENT NEEDED ORDER | OTHER ORDERS | ADJUSTMENT NEEDED POWER FACTOR | OTHER POWER FACTORS | ADJUSTMENT NEEDED ORDER | OTHER ORDERS | ADJUSTMENT NEEDED POWER FACTOR | OTHER POWER FACTORS | ADJUSTMENT NEEDED ORDER | OTHER ORDERS | | ADJUSTMENT NEEDED POWER FACTOR | OTHER POWER FACTORS |
| PRIORITY ORDER | 1 | 6 | 5 | 7 | 2 | 9 | 8 | 10 | 3 | 12 | 4 | 11 | 13 |

POWER CONTROL SYSTEM AND DEVICE

TECHNICAL FIELD

The present disclosure relates to a power control system and a device.

BACKGROUND ART

PTL 1 describes an active filter that is characterized by including a fundamental reactive current control unit that adjusts a fundamental reactive current command value such that an amplitude becomes a target value based on a difference voltage obtained by a voltage value calculation unit, and a current value calculation unit that calculates a harmonic compensation current command value from a harmonic suppression current value and a fundamental reactive current value.

CITATION LIST

Patent Literature

[PTL 1] Japanese Laid-open Patent Publication No. 2004-336870

SUMMARY OF INVENTION

Technical Problem

PTL 1 discloses that, with regard to the adjustment of a harmonic component in a current in an electric line, the electric line is adjusted based on a single index that is set regardless of the order of a harmonic. However, PTL 1 does not disclose that indexes regarding the adjustment are set separately for harmonic components having different orders in the current in the electric line.

An object of the present disclosure is to achieve the adjustment of the electric line based on indexes set separately for harmonic components having different orders in the current in the electric line.

Solution to Problem

A power control system according to the present disclosure is a power control system that causes a device to adjust apparent power in an electric line, and the power control system includes a setting unit that sets an index regarding each adjustment for a harmonic component of a first order group in a current in the electric line, a harmonic component of a second order group higher in order than the first order group in the current in the electric line, and a fundamental component in the current in the electric line, and a control unit that controls the each adjustment by the device based on the index set by the setting unit. In this case, it is possible to achieve the adjustment of the electric line based on the indexes set separately for the harmonic components having different orders in the current in the electric line.

Here, the power control system may further include an acquisition unit that acquires power information on the apparent power in the electric line, and the setting unit may set the index regarding adjustment for a plurality of electric lines based on the power information on the plurality of electric lines. In this case, it is possible to achieve the adjustment of the plurality of electric lines based on the indexes set separately for the harmonic components having different orders for the respective electric lines.

Furthermore, the device may receive power supplied via an electric line, the plurality of electric lines may include a first electric line and a second electric line provided closer to a power reception side than the first electric line, and the setting unit may set the index for the harmonic component of the first order group in the first electric line based on first power information on apparent power in the first electric line and may set the index for the harmonic component of the second order group in the second electric line based on second power information on apparent power in the second electric line. In this case, it is possible to adjust the harmonic component of the order for which the adjustment target is determined for each electric line depending on the positional relationship between the electric line and the device.

Further, the setting unit may set the index such that the second electric line is adjusted in preference to the first electric line when the device adjusts the harmonic component of the second order group in the second electric line and may set the index such that the first electric line is adjusted in preference to the second electric line when the device does not adjust the harmonic component of the second order group in the second electric line. In this case, the electric line to be preferentially adjusted may be determined depending on whether the harmonic component of the second order group in the second electric line is adjusted.

Further, the setting unit may set the index such that the harmonic component of the second order group is adjusted in preference to the harmonic component of the first order group. In this case, the harmonic component to be preferentially adjusted may be determined in accordance with the order of the harmonic component to be adjusted.

Further, when the device adjusts a harmonic component of a predetermined order in the first order group, the setting unit may set the index such that the harmonic component of the first order group is adjusted in preference to the harmonic component of the second order group. In this case, the harmonic component to be preferentially adjusted may be determined in accordance with the order of the harmonic component of the first order group to be adjusted.

Further, an acquisition unit that acquires power information on the apparent power in the electric line may be further included, and the setting unit may set the index such that the harmonic component of the first order group is adjusted in preference to the fundamental component in the electric line when a power factor condition is satisfied, which is set for a power factor specified from the power information on the electric line. In this case, in accordance with the power factor specified from the power information, it is possible to determine the adjustment target to be preferentially adjusted between the harmonic component in the electric line and the fundamental component in the electric line.

Further, an acquisition unit that acquires power information on the apparent power in the electric line may be further included, and the setting unit may set the index such that the fundamental component in the electric line is adjusted in preference to the harmonic component of the first order group when a power factor specified from the power information on the electric line satisfies a predetermined priority condition. In this case, in accordance with the power factor specified from the power information, it is possible to determine the adjustment target to be preferentially adjusted between the harmonic component in the electric line and the fundamental component in the electric line.

Further, the setting unit may set the index such that the harmonic component of the second order group is adjusted in preference to the fundamental component in the electric line even when the power factor specified from the power information on the electric line satisfies the priority condition. In this case, it is possible to determine the priority relation of adjustment between the harmonic component and the fundamental component in accordance with the order of the harmonic component to be adjusted.

Moreover, from another point of view, a device according to the present disclosure is a device that adjusts apparent power in an electric line, and the device includes a setting unit that sets an index regarding each adjustment for a harmonic component of a first order group in a current in the electric line, a harmonic component of a second order group higher in order than the first order group in the current in the electric line, and a fundamental component in the current in the electric line, and a supply unit that supplies a current used for the each adjustment based on the index set by the setting unit. In this case, it is possible to achieve the adjustment of the electric line based on the indexes set separately for the harmonic components having different orders in the current in the electric line.

BRIEF DESCRIPTION OF DRAWINGS

FIG. 5 is a diagram illustrating an electric line management table.

FIG. 6 is a diagram illustrating a relation management table.

FIG. 7 is a diagram illustrating an HPS management table.

FIG. 9 is a diagram illustrating a relation management table according to a modification.

DESCRIPTION OF EMBODIMENTS

An embodiment will be described below with reference to the accompanying drawings.

Figure 1:
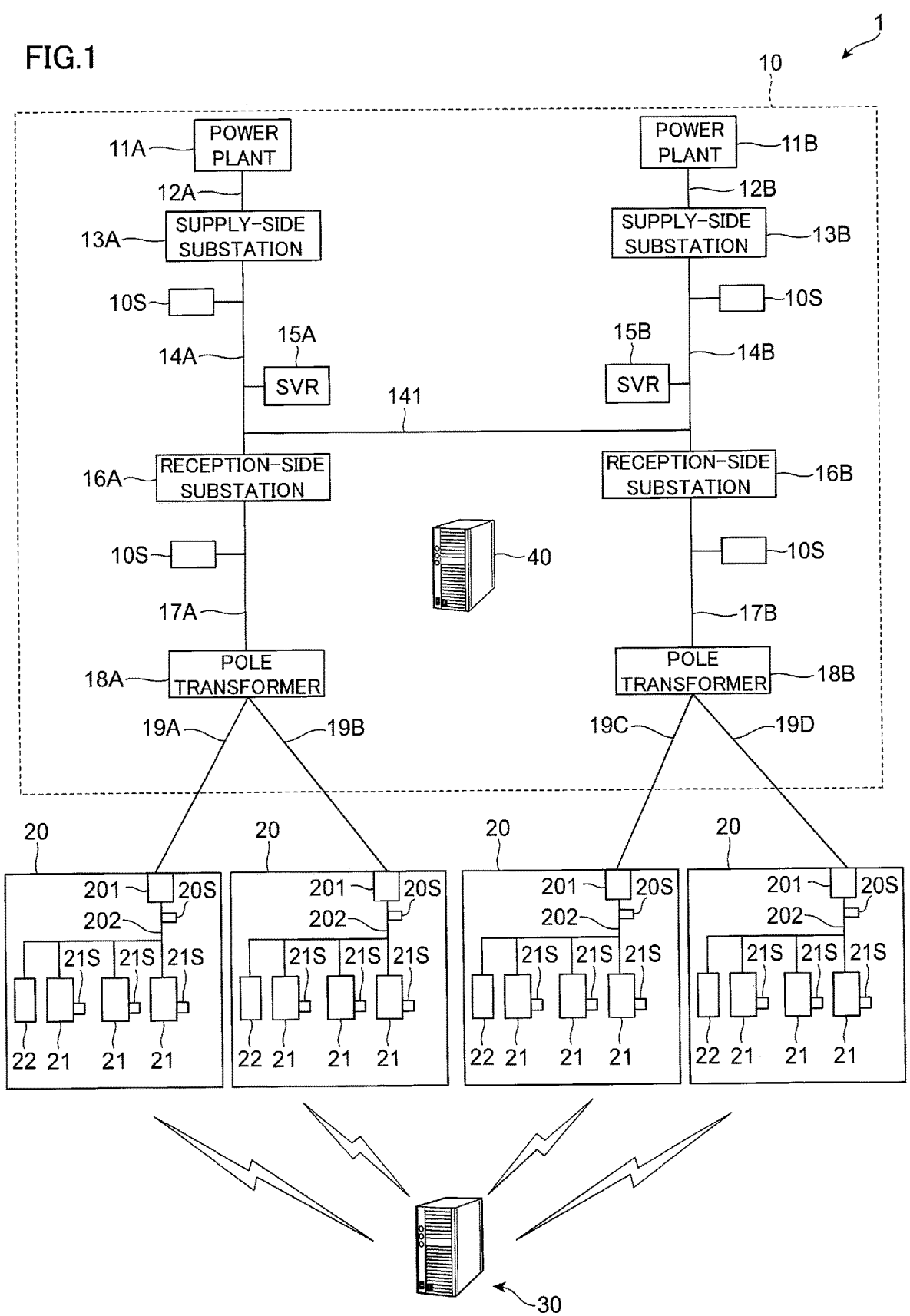
FIG. 1 is a diagram illustrating an example of a power control system according to the present embodiment.

FIG. 1 is a diagram illustrating an example of a power control system 1 according to the present embodiment.

The power control system 1 is a system that controls apparent power.

The power control system 1 includes a power system 10, a plurality of power consumption facilities 20, a control server 30, and a management server 40.

The power system 10 is a system in which a facility is provided to supply the power to a power demander. The power system 10 includes a power plant 11, a transmission line 12, a supply-side substation 13, a supply-side distribution line 14, a coupling line 141, an automatic voltage regulator (SVR: Step Voltage Regulator) 15, a reception-side substation 16, a reception-side distribution line 17, a pole transformer 18, and a demander-side distribution line 19.

The power plant 11 is a facility that generates power. Examples of the power plant 11 include a thermal power plant, a hydraulic power plant, a nuclear power plant, a solar power plant, a wind power plant, and a geothermal power plant.

The power system 10 includes a plurality of the power plants 11. The illustrated example includes the two power plants 11 including a power plant 11A and a power plant 11B. Furthermore, the power plant 11A and the power plant 11B may be simply referred to as the power plants 11 when they are not distinguished from each other in particular in the description.

The transmission line 12 is a line to flow the current forming the power generated by the power plant 11. The transmission line 12 is provided from the power plant 11 to the supply-side substation 13.

The power system 10 includes a plurality of the transmission lines 12. The illustrated example includes the two transmission lines 12 including a transmission line 12A and a transmission line 12B. Furthermore, the transmission line 12A and the transmission line 12B may be simply referred to as the transmission lines 12 when they are not distinguished from each other in particular in the description.

The supply-side substation 13 is a facility that converts the voltage. The supply-side substation 13 is provided closer to the power supply side than the reception-side substation 16. According to the present embodiment, the facility located closest to the power supply side is the power plant 11. Furthermore, the facility located closest to the power reception side is the power consumption facility 20.

The supply-side substation 13 converts the voltage supplied through the transmission line 12. Examples of the supply-side substation 13 include a substation that converts a voltage of 500000 V into 154000 V, a substation that converts a voltage of 154000 V into 66000 V, and a substation that converts a voltage of 66000 V into 22000 V.

The power system 10 includes a plurality of the supply-side substations 13. The illustrated example includes the two supply-side substations 13 including a supply-side substation 13A and a supply-side substation 13B. Furthermore, the supply-side substation 13A and the supply-side substation 13B may be simply referred to as the supply-side substations 13 when they are not distinguished from each other in particular in the description.

The supply-side distribution line 14 is a line to flow the current generated by applying the voltage converted by the supply-side substation 13. The supply-side distribution line 14 is provided from the supply-side substation 13 to the reception-side substation 16. Furthermore, the supply-side distribution line 14 is provided closer to the power supply side than the reception-side distribution line 17.

The power system 10 includes a plurality of the supply-side distribution lines 14. The illustrated example includes the two supply-side distribution lines 14 including a supply-side distribution line 14A and a supply-side distribution line 14B. The current forming the power generated by the power plant 11A flows through the supply-side distribution line 14A. Further, the current forming the power generated by the power plant 11B flows through the supply-side distribution line 14B. Furthermore, the supply-side distribution line 14A and the supply-side distribution line 14B may be simply referred to as the supply-side distribution lines 14 when they are not distinguished from each other in particular in the description.

The coupling line 141 is a line coupling the supply-side distribution line 14A and the supply-side distribution line 14B. According to the present embodiment, the current forming the power generated by the power plant 11A may flow into the supply-side distribution line 14B via the supply-side distribution line 14A and the coupling line 141. Further, the current forming the power generated by the power plant 11B may flow into the supply-side distribution line 14A via the supply-side distribution line 14B and the coupling line 141. In other words, the coupling line 141 may transmit the power supplied via the supply-side distribution line 14B to the supply-side distribution line 14A and may transmit the power supplied via the supply-side distribution line 14A to the supply-side distribution line 14B.

The SVR 15 regulates the voltage supplied to the supply-side distribution line 14. More Specifically, the SVR 15 detects the voltage supplied to the supply-side distribution line 14. Further, when the detected voltage does not fall within a predetermined range, the SVR 15 regulates the voltage such that the voltage falls within the predetermined range.

The power system 10 includes a plurality of the SVRs 15. The illustrated example includes the two SVRs 15 including an SVR 15A and an SVR 15B. Furthermore, the SVR 15A and the SVR 15B may be simply referred to as the SVRs 15 when they are not distinguished from each other in particular in the description.

The reception-side substation 16 is a facility that converts the voltage supplied through the supply-side distribution line 14. Examples of the reception-side substation 16 include a substation that converts the supplied voltage into 6600 V.

The power system 10 includes a plurality of the reception-side substations 16. The illustrated example includes the two reception-side substations 16 including a reception-side substation 16A and a reception-side substation 16B. The reception-side substation 16A converts the voltage supplied through the supply-side distribution line 14A. Furthermore, the reception-side substation 16B converts the voltage supplied through the supply-side distribution line 14B. Further, the reception-side substation 16A and the reception-side substation 16B may be simply referred to as the reception-side substations 16 when they are not distinguished from each other in particular in the description.

The reception-side distribution line 17 is a line to flow the current generated by applying the voltage converted by the reception-side substation 16. The reception-side distribution line 17 is provided from the reception-side substation 16 to the pole transformer 18.

The power system 10 includes a plurality of the reception-side distribution lines 17. The illustrated example includes the two reception-side distribution lines 17 including a reception-side distribution line 17A and a reception-side distribution line 17B. The current generated by applying the voltage converted by the reception-side substation 16A flows through the reception-side distribution line 17A. Further, the current generated by applying the voltage converted by the reception-side substations 16B flows through the reception-side distribution line 17B. Further, the reception-side distribution line 17A and the reception-side distribution line 17B may be simply referred to as the reception-side distribution lines 17 when they are not distinguished from each other in particular in the description.

The pole transformer 18 is a facility that converts the voltage supplied through the reception-side distribution line 17. Examples of the pole transformer 18 include a transformer that converts a voltage of 6600 V to 200 V and a transformer that converts a voltage of 6600 V to 100 V.

The power system 10 includes a plurality of the pole transformers 18. The illustrated example includes the two pole transformers 18 including a pole transformer 18A and a pole transformer 18B. The pole transformer 18A converts the voltage supplied through the reception-side distribution line 17A. Further, the pole transformer 18B converts the voltage supplied through the reception-side distribution line 17B. Furthermore, the pole transformer 18A and the pole transformer 18B may be simply referred to as the pole transformers 18 when they are not distinguished from each other in particular in the description.

The demander-side distribution line 19 is a line to flow the current generated when the voltage converted by the pole transformer 18 is applied. The power system 10 includes a plurality of the demander-side distribution lines 19. More specifically, the demander-side distribution line 19 is provided for each of the power consumption facilities 20. Each of the demander-side distribution lines 19 is provided from the pole transformer 18 to the power consumption facility 20. The illustrated example includes the four demander-side distribution lines 19 including a demander-side distribution line 19A to a demander-side distribution line 19D. Furthermore, the demander-side distribution line 19A to the demander-side distribution line 19D may be simply referred to as the demander-side distribution lines 19 when they are not distinguished from each other in particular in the description.

As described above, the power system 10 is a system provided outside the power consumption facility 20 and is a system that distributes the generated power to demanders of the power.

Further, the power system 10 includes a plurality of power sensors 10S. The power sensor 10S is coupled to the supply-side distribution line 14. More specifically, the power sensor 10S is coupled to a portion of the supply-side distribution line 14 closer to the power supply side than the SVR 15. Moreover, the power sensors 10S are coupled to the reception-side distribution lines 17, respectively. In other words, the power sensor 10S is provided individually for the supply-side distribution line 14 and the reception-side distribution line 17.

The power sensor 10S detects a parameter regarding the apparent power in the coupled supply-side distribution line 14 or the reception-side distribution line 17. The parameter regarding the apparent power is a parameter that affects the apparent power. Examples of the parameter regarding the apparent power include apparent power, reactive power, reactive voltage, harmonic voltage, current, and apparent power amount and reactive power amount in a predetermined period. The current as a parameter regarding the apparent power includes a fundamental component and a harmonic component. The fundamental is a sine wave including the lowest frequency component. Further, the harmonic is a frequency component that is the integral multiple of the fundamental. Further, the integral multiple is twice or more. Therefore, the fundamental is not included in the harmonics. Hereinafter, the fundamental component of the current may be referred to as fundamental current. Further, the harmonic component of the current may be hereinafter referred to as harmonic current. Moreover, examples of the harmonic voltage and the harmonic current include a low-order harmonic voltage and a low-order harmonic current. Examples of the low order include a predetermined order. Examples of the predetermined order include a third order or higher and a thirteenth order or lower. Furthermore, examples of the harmonic voltage and the harmonic current include a high-order harmonic voltage and a high-order harmonic current. High orders are orders that are higher than low orders. Examples of the high order include the 17th order or higher and the 40th order or lower.

Further, examples of the parameter regarding the apparent power include a total harmonic distortion (THD: Total Harmonic Distortion) of the current and the THD of the voltage. Here, the THD of the current is calculated from Equation (1) below. Moreover, the THD of the voltage is calculated from Equation (2) below.

$$THD = \sqrt{\sum_{n=2}^{40}\left(\frac{I_n}{I_1}\right)^2} \quad (1)$$

$$THD = \sqrt{\sum_{n=2}^{40}\left(\frac{V_n}{V_1}\right)^2} \quad (2)$$

In Equation (1) above, $I_1$ is a fundamental current. Furthermore, $I_n$ is an n-th order harmonic current.

In Equation (2) above, $V_1$ is a fundamental voltage. Further, $V_n$ is an n-th order harmonic voltage.

For example, the power sensor 10S detects the above-described parameter regarding the apparent power at predetermined time intervals. Hereinafter, the parameter regarding the apparent power in the electric line may be referred to as power information. Examples of the power information include information indicating a parameter regarding the apparent power in the electric line. Further, the power information may be information indicating a waveform of a current in the electric line. Further, the predetermined time may be any time, but is for example one hour. Further, when detecting the power information, the power sensor 10S transmits the detected power information to the management server 40 together with the electric line identification information for identifying the electric line to be detected.

Further, the numbers of the power plants 11, the transmission lines 12, the supply-side substations 13, the reception-side substations 16, the pole transformers 18, and the demander-side distribution lines 19 provided in the power system 10 are not limited to the illustrated example. The numbers of the power plants 11, the transmission lines 12, the supply-side substations 13, the reception-side substations 16, the pole transformers 18, and the demander-side distribution lines 19 provided in the power system 10 may be larger or smaller than that in the illustrated example.

Further, the numbers of the supply-side distribution lines 14 and the reception-side distribution lines 17 are not limited to the illustrated example. The power system 10 may include the supply-side distribution lines 14 and the reception-side distribution lines 17 that are larger in number than those illustrated in the drawing. In this case, the power sensor 10S may be provided for each of the supply-side distribution lines 14, or the power sensor 10S may be provided for each of the reception-side distribution lines 17.

The power consumption facility 20 is a facility that receives and consumes the power supplied from the power plant 11 through the demander-side distribution line 19. Each of the power consumption facilities 20 includes a power reception facility 201, an in-facility electric line 202, and a facility power sensor 20S.

The power reception facility 201 receives the power supplied from the power system 10. Furthermore, the power reception facility 201 converts the voltage of the received power into a voltage used in a facility inside the power consumption facility 20. Examples of the power reception facility 201 include a switchboard and a distribution board.

The in-facility electric line 202 is a line to flow the current forming the power received by the power reception facility 201. The in-facility electric line 202 is provided from the power reception facility 201 to each device that consumes the power in the power consumption facility 20. Furthermore, according to the present embodiment, the supply-side distribution line 14, the reception-side distribution line 17, and the in-facility electric line 202 may be simply referred to as "electric lines" when they are not distinguished from each other in particular in the description.

For example, the facility power sensor 20S detects the power information on the apparent power in the in-facility electric line 202 at predetermined time intervals. The predetermined time may be any time, but is for example one hour. Furthermore, when detecting the power information, the facility power sensor 20S transmits the detected power information to the control server 30 together with the electric line identification information for identifying the in-facility electric line 202 to be detected.

Further, the power information detected by the power sensor 10S and the facility power sensor 20S is not limited to one type of parameter regarding the apparent power. The power sensor 10S and the facility power sensor 20S may detect a plurality of types of parameters among the above-described parameters regarding the apparent power. Further, the power information indicating each of the plurality of types of parameters detected may be transmitted to the control server 30 or the management server 40. Further, the power sensor 10S and the facility power sensor 20S may be provided for each type of parameter to be detected.

Furthermore, each of the power consumption facilities 20 includes the plurality of heat pump systems (HPS: Heat Pump System) 21 and the load 22.

The HPS 21, which is an example of the device, uses the power received from the power system 10 to adjust the temperature and humidity. Examples of the target to be adjusted by the HPS 21 include the temperature and humidity of the space in the power consumption facility 20. Further, examples of the target to be adjusted by the HPS 21 include the temperature of the liquid provided in the power consumption facility 20.

Furthermore, the HPS 21 according to the present embodiment may supply the current. The HPS 21 supplies the current to adjust the above parameters regarding the apparent power in the HPS 21. Further, the HPS 21 may supply the current to the electric line. The HPS 21 supplies the current to the electric line to adjust the above parameter regarding the apparent power in the electric line.

An example of the technique for adjusting the parameter regarding the apparent power in the electric line by the HPS 21 will be described. When the harmonic current of a specific order occurs in the electric line, the HPS 21 supplies, to the electric line, the current having a phase canceling the harmonic current of the specific order to reduce the harmonic current of the specific order in the electric line.

Another example of the technique for adjusting the parameter regarding the apparent power in the electric line by the HPS 21 will be described. When the reactive power occurs in the electric line, the HPS 21 supplies the current to the electric line to reduce the reactive power in the electric line. Further, the supply of the current adjusts the phase of the fundamental current and improves the power factor in the electric line.

As described above, according to the present embodiment, the parameter regarding the apparent power in the electric line is adjusted by using the HPS 21. Further, the HPS 21 adjusts the parameter regarding the apparent power in the HPS 21 by using a technique similar to that for adjusting the electric line. Here, as the parameter regarding the apparent power changes, the apparent power also changes. Therefore, in a broad sense, the adjustment of each of the above-described parameters regarding the apparent power may be regarded as the adjustment of the apparent power. Hereinafter, each of the parameters regarding the apparent power to be adjusted may be collectively referred to as "apparent power".

Examples of the HPS 21 include a system that adjusts the temperature and humidity. More specific examples of the HPS 21 include devices used in an HVAC (Heating Ventilation and Air Conditioning) system, such as air conditioning apparatuses, showcases for conditioning the internal temperature, coolers, refrigerating machines, and water heaters.

When an instruction for adjusting the apparent power in the electric line is received from the control server 30, the HPS 21 supplies the current to the electric line in response to the received instruction to adjust the apparent power in the electric line.

The load 22 receives and consumes the power supplied from the power plant 11 through the demander-side distribution line 19.

Furthermore, according to the present embodiment, an HPS sensor 21S is provided for each of the HPSes 21 in each of the power consumption facilities 20. The HPS sensor 21S detects a current value supplied from the HPS 21, a current value per unit time, or a current value in a predetermined time. Furthermore, the current value, the current value per unit time, and the current value in the predetermined time may be simply and collectively referred to as "current" when they are not distinguished from each other in particular in the description.

The HPS sensor 21S detects the current supplied from the HPS 21 at predetermined time intervals, for example. The predetermined time may be any time, but is for example one hour. Furthermore, the information detected by the HPS sensor 21S as the information indicating the current supplied from the HPS 21 may be hereinafter referred to as supply information. When detecting the supply information, the HPS sensor 21S transmits the detected supply information to the control server 30 together with the HPS identification information for identifying the HPS 21 to be detected.

Further, the one power consumption facility 20 is provided for each of the demander-side distribution lines 19 in the illustrated example, but is not limited thereto. The power consumption facilities 20 may be provided for each of the demander-side distribution lines 19. Further, the numbers of the HPSes 21 and the loads 22 provided in the power consumption facility 20 are not limited to the illustrated example. The power consumption facility 20 may include the HPSes 21 and the loads 22 that are larger in number than those illustrated in the drawing. Further, the power consumption facility 20 may include none of the HPSes 21 or the loads 22. Moreover, the power consumption facility 20 may include a device different from the HPS 21.

The control server 30 is a server device that controls an operation of the HPS 21. More specifically, the control server 30 controls an operation of the HPS 21 to adjust the apparent power in the electric line. The control server 30 acquires the power information from the management server 40 and the facility power sensor 20S. Furthermore, when acquiring the power information, the control server 30 determines whether to adjust the apparent power in the electric line based on the acquired power information. Further, when it is determined that the apparent power in the electric line is adjusted, an index regarding the adjustment of the apparent power in the electric line to be adjusted is set so that the HPS 21 adjusts the apparent power in the electric line based on the set index.

Furthermore, according to the present embodiment, the control server 30 sets the index regarding each adjustment for the low-order harmonic current in the electric line and the high-order harmonic current in the electric line. Further, based on each of the set indexes, the HPS 21 adjusts the low-order harmonic current in the electric line and the high-order harmonic current in the electric line.

The management server 40 is a server device that manages the power information. When acquiring the power information from the power sensor 10S, the management server 40 transmits the acquired power information to the control server 30 together with the electric line identification information for identifying the electric line that is the target of the power information.

The management server 40 and the control server 30 are implemented by, for example, a computer. The management server 40 and the control server 30 may be configured by a single computer or may be implemented by distributed processing using a plurality of computers. Further, the management server 40 and the control server 30 may be implemented on virtual hardware provided by cloud computing. Moreover, in the following description, the control server 30 and the management server 40 may be simply referred to as "servers" when they are not distinguished from each other in particular.

According to the present embodiment, the control server 30 is connected to each device provided in each of the power consumption facilities 20 and the management server 40 via a network (not illustrated). Furthermore, the management server 40 is connected to each of the power sensors 10S via a network (not illustrated). These networks may be any network that enables data transmission and reception. Furthermore, a communication line used for transmitting and receiving data may be wired, wireless, or power line communication (PLC: Power Line Communication). Furthermore, the configuration may include the connection to a communication destination via a plurality of networks or communication lines.

Furthermore, the numbers of the control servers 30 and the management servers 40 are not limited to the illustrated example. The power control system 1 may include the two or more control servers 30 or the two or more management servers 40. Moreover, the control server 30 may be provided for each of the power consumption facilities 20, for example.

Figure 2:
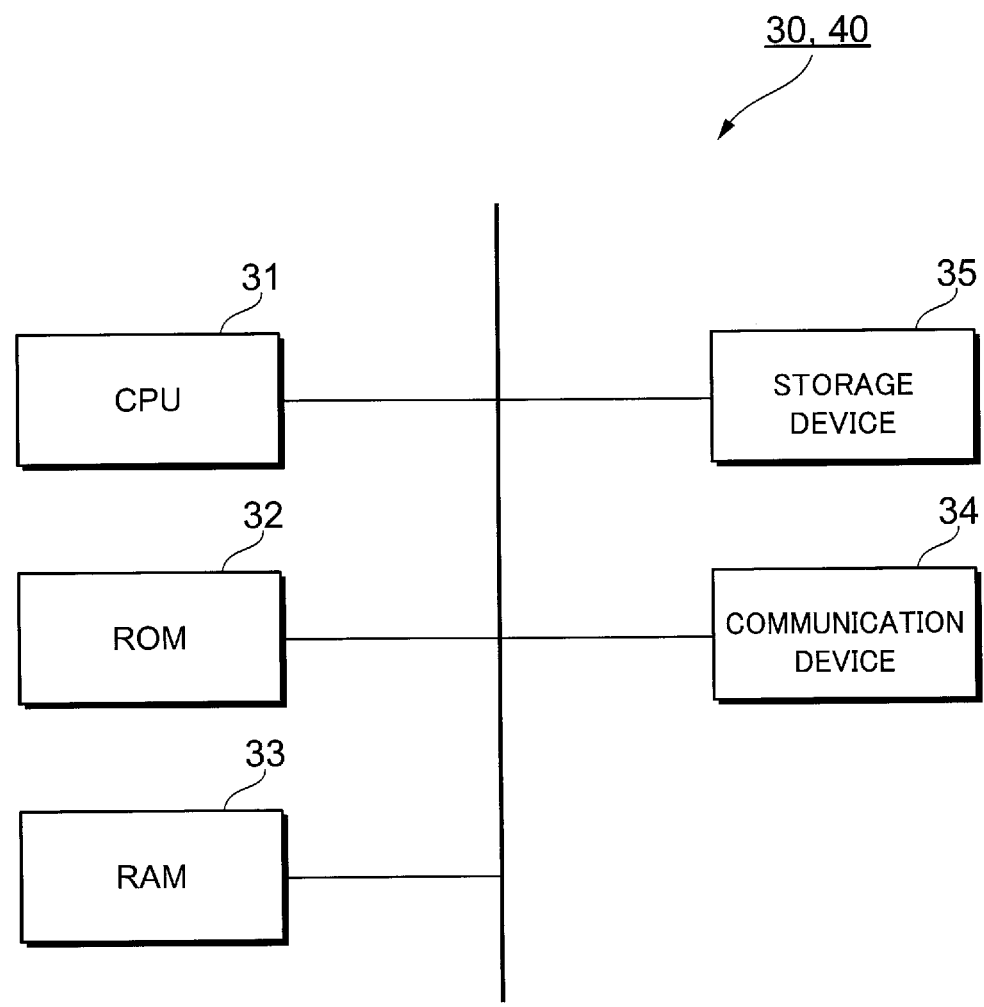
FIG. 2 is a diagram illustrating a hardware configuration of a control server and a management server.

FIG. 2 is a diagram illustrating a hardware configuration of the control server 30 and the management server 40.

The server includes a CPU 31, a ROM (Read Only Memory) 32, and a RAM (Random Access Memory) 33. Further, the server includes a storage device 35 that is configured by a hard disk device, or the like, to store information. Further, the server includes a communication device 34 (communication I/F) that performs communications with an external unit.

In addition, the server includes an input device used for inputting information, such as a keyboard and a mouse, and a display device, such as a liquid crystal display.

The ROM 32 and the storage device 35 store programs to be executed by the CPU 31. The CPU 31 reads a program stored in the ROM 32 or the storage device 35 and executes the program using the RAM 33 as a work area.

The CPU 31 executes a program stored in the ROM 32 and the storage device 35 to thus implement each functional unit described below.

Here, the program to be executed by the CPU 31 may be provided to the server by being stored in a computer-readable recording medium such as magnetic recording medium (e.g., magnetic tape and magnetic disk), optical recording medium (e.g., optical disk), magneto-optical recording medium, and semiconductor memory. Further, the program to be executed by the CPU 31 may be provided to the server using a communication means such as the Internet.

Figure 3:
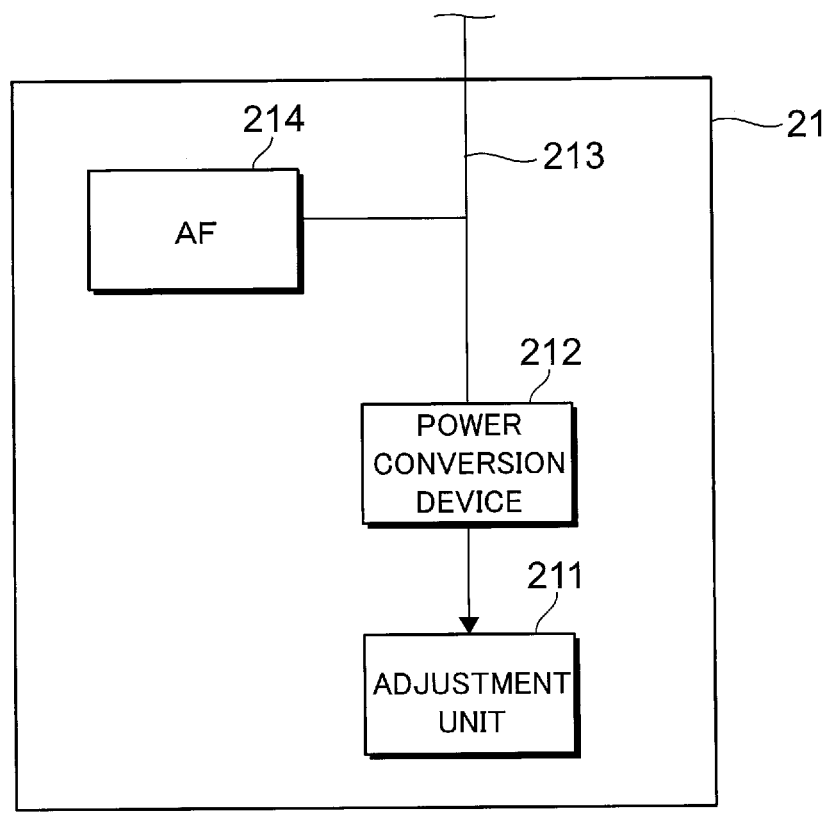
FIG. 3 is a diagram illustrating a functional configuration of an HPS.

FIG. 3 is a diagram illustrating a functional configuration of the HPS 21.

The HPS 21 includes an adjustment unit 211, a power conversion device 212, a power reception path 213, and an active filter (AF: Active Filter) 214.

The adjustment unit 211 adjusts the temperature and humidity. The adjustment unit 211 includes a motor (not illustrated) that operates using the received power. Furthermore, the adjustment unit 211 includes a heat exchanger (not illustrated) so that the air and liquid in the power consumption facility 20 exchanges heat through the heat exchanger.

The power conversion device 212 includes an inverter (not illustrated) and a converter (not illustrated). The power conversion device 212 uses the inverter and the converter to convert the power received from the power system 10 into power having a specific voltage and a specific frequency. The specific voltage and the specific frequency are the voltage and the frequency needed for the operation of the motor provided in the adjustment unit 211. The power conversion device 212 supplies the converted power to the adjustment unit 211.

The power reception path 213 is a path to pass the power received by the power conversion device 212 in the HPS 21.

The AF 214 is electrically connected to the power reception path 213 of the power conversion device 212 in parallel with the power conversion device 212. The AF 214 supplies the current to the power reception path 213 of the power conversion device 212 to adjust the apparent power in the power reception path 213.

Furthermore, the AF 214 supplies the current to the electric line to adjust the apparent power in the electric line.

Moreover, the current to be detected by the HPS sensor 21S (see FIG. 1) is the current supplied from the AF 214.

Furthermore, although FIG. 3 illustrates the functional configuration of the HPS 21, the device used to adjust the apparent power in the electric line is not limited to the HPS 21.

The device used for adjusting the apparent power in the electric line may be any device that may supply the current to the electric line. Examples of the device that may supply the current to the electric line include a device including a power conversion device. More specifically, examples of the device that may supply the current to the electric line include a device including a power conversion device including at least one of an inverter and a converter. Furthermore, examples of the device including the power conversion device include an electric vehicle and a storage battery. Further, examples of the device including the power conversion device include a system that generates renewable energy such as a solar power generation system and a wind power generation system.

Figure 4:
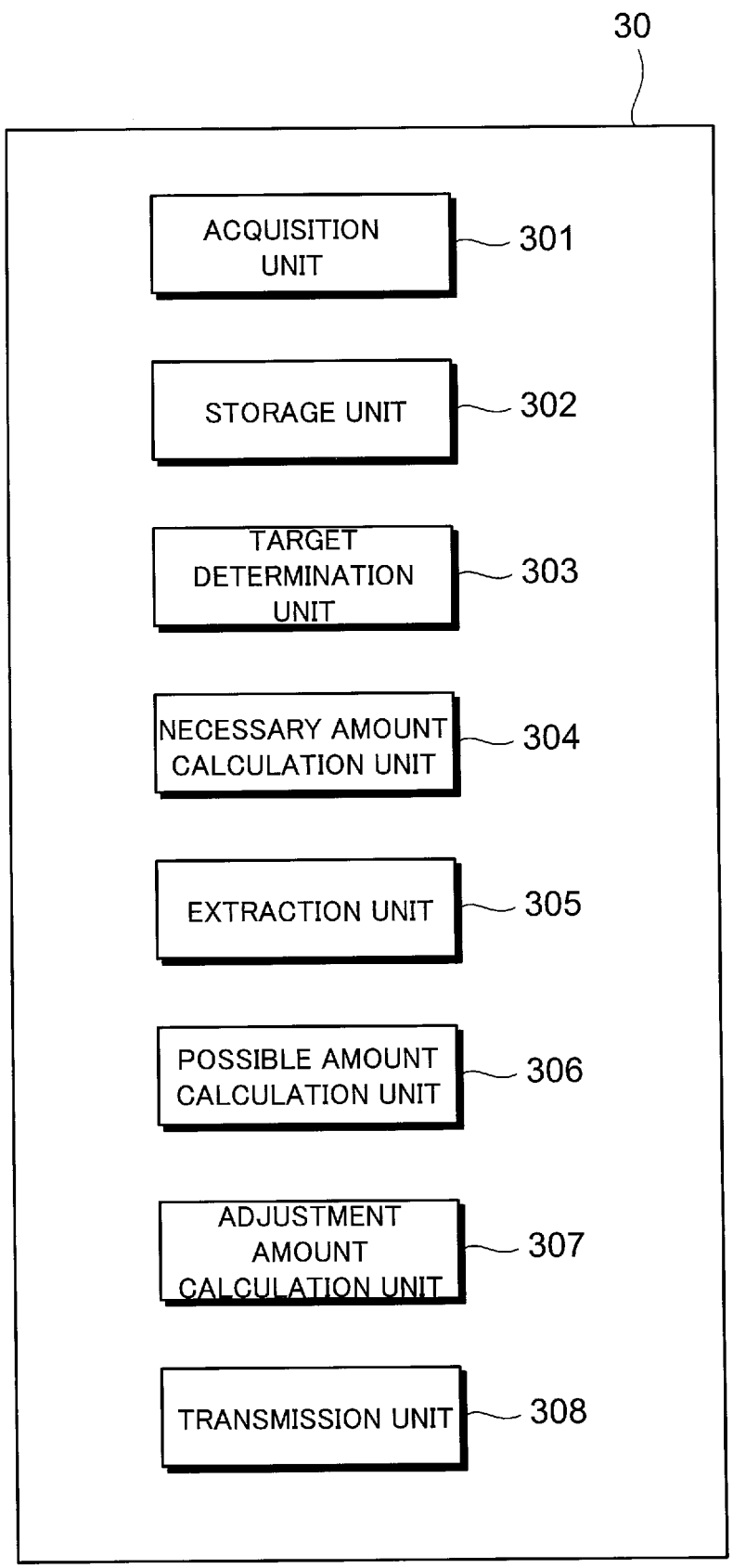
FIG. 4 is a diagram illustrating a functional configuration of the control server.

FIG. 4 is a diagram illustrating a functional configuration of the control server 30.

The control server 30 includes an acquisition unit 301, a storage unit 302, a target determination unit 303, a necessary amount calculation unit 304, an extraction unit 305, a possible amount calculation unit 306, an adjustment amount calculation unit 307, and a transmission unit 308.

The acquisition unit 301, which is an example of an acquisition unit, acquires information transmitted to the control server 30 or information input to the control server 30. Examples of the information acquired by the acquisition unit 301 include the power information transmitted from the management server 40 and the facility power sensor 20S and the supply information transmitted from the HPS sensor 21S. Further, the acquisition unit 301 acquires, from each of the HPSes 21, the information indicating the capacity of current that may be supplied by the AF 214 of each of the HPSes 21. The capacity of current that may be supplied by the AF 214 is the maximum current that may be supplied by the AF 214. Furthermore, the information indicating the capacity of power that may be supplied by the AF 214 may be hereinafter referred to as capacity information. Furthermore, the user of the power control system 1 may input the capacity information on each of the HPSes 21 to the control server 30 so that the acquisition unit 301 acquires the capacity information. The storage unit 302 stores the information acquired by the acquisition unit 301.

The storage unit 302 stores information. The information stored in the storage unit 302 will be described below in detail.

The target determination unit 303 determines the target to be adjusted by the HPS 21. More specifically, the target determination unit 303 determines the electric line to be adjusted by the HPS 21. Based on the power information acquired by the acquisition unit 301, the target determination unit 303 determines whether it is necessary to adjust the apparent power in the electric line related to the power information. Hereinafter, the target electric line for which the target determination unit 303 determines that the adjustment of the apparent power is necessary may be referred to as adjustment target electric line.

Furthermore, the target determination unit 303 determines the parameter regarding the apparent power to be adjusted by the HPS 21 for the adjustment target electric line. In other words, the target determination unit 303 specifies the type of target for which the adjustment is necessary in the adjustment target electric line. The target determination unit 303 determines the parameter to be adjusted by the HPS 21 among the parameters regarding the apparent power in the adjustment target electric line based on the power information on the adjustment target electric line. Moreover, among the parameters regarding the apparent power in the adjustment target electric line, the parameter determined as the adjustment target by the target determination unit 303 may be hereinafter referred to as adjustment target.

Furthermore, when the adjustment target is a harmonic current, the target determination unit 303 specifies the order of the harmonic current that is the adjustment target. Further, when the adjustment target is a fundamental current in the adjustment target electric line, the target determination unit 303 specifies the power factor in the adjustment target electric line.

The necessary amount calculation unit 304 calculates the necessary current to be supplied to the adjustment target electric line in order to improve the adjustment target. Hereinafter, the necessary current to be supplied to the adjustment target electric line in order to improve the adjustment target may be referred to as adjustment necessary amount. The necessary amount calculation unit 304 calculates the adjustment necessary amount based on the power information on the adjustment target electric line. Further, when there is a plurality of adjustment targets, the necessary amount calculation unit 304 calculates the adjustment necessary amount for each adjustment target.

The extraction unit 305 extracts the candidate of the HPS 21 to be used for the adjustment of the apparent power in the adjustment target electric line. The extraction unit 305 extracts the HPS 21 that receives the power through the adjustment target electric line among the HPSes 21 provided in the power control system 1 as the candidate of the HPS 21 to be used for the adjustment of the adjustment target electric line.

The possible amount calculation unit 306 calculates the current that may be supplied by the AF 214 of the HPS 21 to adjust the apparent power in the electric line. Hereinafter, the current that may be supplied by the AF 214 of the HPS 21 to adjust the apparent power in the electric line may be referred to as adjustable amount. The possible amount calculation unit 306 subtracts the current supplied from the HPS 21 from the maximum current that may be supplied by the AF 214 of the HPS 21 to calculate the adjustable amount. Here, the maximum current that may be supplied by the AF 214 in the HPS 21 is specified from the capacity information. Furthermore, the current supplied from the HPS 21 is specified from the latest supply information.

The possible amount calculation unit 306 calculates the adjustable amount at predetermined time intervals. The predetermined time may be any time, but is for example one hour. Further, the possible amount calculation unit 306 calculates the adjustable amount for each of the HPSes 21. When calculating the adjustable amount, the possible amount calculation unit 306 stores the calculated adjustable amount in the storage unit 302.

The adjustment amount calculation unit 307, which is an example of a setting unit, calculates the current to be supplied to the adjustment target electric line to adjust the adjustment target. Hereinafter, the current supplied to the adjustment target electric line to adjust the adjustment target may be referred to as adjustment amount. The adjustment amount is regarded as the index for the adjustment of the apparent power in the electric line. Furthermore, when there is a plurality of adjustment targets, the adjustment amount calculation unit 307 calculates the adjustment amount for each of the adjustment targets. In this case, the adjustment amount calculation unit 307 calculates the adjustment amount for each of the adjustment targets based on the adjustment necessary amount calculated by the necessary amount calculation unit 304, the adjustable amount calculated by the possible amount calculation unit 306, and the relation between the adjustment targets. Further, based on the calculated adjustment amount, the adjustment amount calculation unit 307 calculates the current to be supplied from the AF 214 to adjust the adjustment target. Moreover, the current supplied from the AF 214 to adjust the adjustment target may be hereinafter referred to as supply amount.

The transmission unit 308 transmits the information indicating the supply amount calculated by the adjustment amount calculation unit 307 to each of the HPSes 21. More specifically, the transmission unit 308 transmits the information indicating the supply amount to the target HPS 21 that supplies the supply amount together with the electric line identification information for identifying the adjustment target electric line to which the supply amount is supplied.

FIG. 5 is a diagram illustrating an electric line management table. The electric line management table is a table to manage the electric lines. The storage unit 302 of the control server 30 stores the electric line management table.

In the electric line management table, "electric line" indicates the electric line identification information. "14" indicated in "electric line" represents the supply-side distribution line 14. Further, "A" and "B" accompanied with "14" are information for identifying the corresponding ones of the supply-side distribution line 14A and the supply-side distribution line 14B. Furthermore, "17" indicated in "electric line" represents the reception-side distribution line 17. Further, "A" and "B" accompanied with "17" are information for identifying the corresponding ones of the reception-side distribution line 17A and the reception-side distribution line 17B. Further, "202" indicated in "electric line" refers to the in-facility electric line 202. Moreover, "A" to "D" accompanied with "202" are the information for identifying the corresponding ones of the in-facility electric lines 202.

Furthermore, in the electric line management table, "power information" indicates the power information detected by the power sensor 10S or the facility power sensor 20S. Each time the latest power information is acquired, the acquisition unit 301 overwrites "power information" associated with the target "electric line" with the acquired latest power information.

Furthermore, in the electric line management table, "threshold" indicates the threshold set for the apparent power in "electric line". The "threshold" is a threshold used for determination by the target determination unit 303 as to whether the adjustment of the apparent power in "electric line" is necessary. As "threshold", the upper limit value of "power information" may be set, based on which the target determination unit 303 determines that the adjustment of the apparent power in "electric line" is unnecessary, or a value higher than the upper limit value may be set. Furthermore, as "threshold", the lower limit value of "power information" may be set, based on which the target determination unit 303 determines that the adjustment of the apparent power in "electric line" is unnecessary, or a value lower than the lower limit value may be set. Furthermore, the range of values of "power information" based on which the target determination unit 303 determines that the adjustment of the apparent power in "electric line" is unnecessary may be set as "threshold". Further, the range of values of "power information" based on which the target determination unit 303 determines that the adjustment of the apparent power in "electric line" is necessary may be set as "threshold". Moreover, as "threshold", a threshold may be set for each of the above-described parameters regarding the apparent power.

According to the present embodiment, each "threshold" indicates at least a threshold set for each order of the harmonic current in the electric line and a threshold set for the fundamental current in the electric line.

An example of the content of the electric line management table will be described. For the supply-side distribution line 14A specified from "14A" of "electric line", "P1" is indicated as "power information", and "T1" is indicated as "threshold".

FIG. 6 is a diagram illustrating a relation management table. The relation management table is a table to manage the relation of adjustment by the HPS 21 for a plurality of adjustment targets. The storage unit 302 of the control server 30 stores the relation management table.

In the relation management table, "electric line" indicates the type of electric line. "14" indicated in "electric line" represents the supply-side distribution line 14. Furthermore, "17" indicated in "electric line" represents the reception-side distribution line 17. Further, "202" indicated in "electric line" refers to the in-facility electric line 202.

Further, in the relation management table, "adjustment target" indicates the type of adjustment target.

"Low-order group harmonic" indicated in "adjustment target" means that the adjustment target is a harmonic current in a low order group. Examples of the low order group include a predetermined range of orders. The predetermined range of orders is, for example, the range of the third order or higher and the thirteenth order or lower. Furthermore, the range of orders different from the range of the third order or higher and the thirteenth order or lower may be set as the low order group. The low order group is an example of a first order group.

Further, "fundamental" indicated in "adjustment target" means that the adjustment target is a fundamental current.

Moreover, "high-order group harmonic" is indicated in "adjustment target" associated with "electric line" of "202". "High-order group harmonic" means that the adjustment target is a harmonic current in a high order group. The high order group is a predetermined range of orders and is a range of orders higher than the low order group. Examples of the high order group include a range of the 17th order or higher and the 40th order or lower. Furthermore, the range of orders different from the range of the 17th order or higher and the 40th order or lower may be set as the high order group. The high order group is an example of a second order group.

Furthermore, "adjustment-needed order" and "other orders" are indicated in "low-order group harmonic" associated with "electric line" of "14" and "17". "Adjustment-needed order" is an order that is determined to have a higher necessity of adjustment of a harmonic current than "other orders" in the low order group. According to the present embodiment, the adjustment-needed orders are the fifth order and the seventh order. Further, "other orders" are orders different from "adjustment-needed order" among the orders belonging to the low order group.

Moreover, an order different from the fifth order and the seventh order among the orders belonging to the low order group may be set as "adjustment-needed order".

Furthermore, "adjustment-needed power factor" and "other power factors" are indicated in "fundamental" that is "adjustment target". "Adjustment-needed power factor" is a power factor that is determined to have a higher necessity of adjustment of the fundamental current than "other power factors". Further, according to the present embodiment, the adjustment-needed power factor is a power factor less than 75%. Further, "other power factors" is a power factor different from "adjustment-needed power factor". Further, a power factor different from the power factor less than 75% may be set as "adjustment-needed power factor".

Furthermore, as described above, the "fundamental" in "electric line" is adjusted so that the power factor in the "electric line" is improved. Therefore, in the relation management table, the items related to the power factor are provided as items classified for "fundamental" that is "adjustment target".

Furthermore, according to the present embodiment, "high-order group harmonic" is not provided in "adjustment target" of "electric line" of "14" and "17".

According to the present embodiment, harmonics may occur due to devices provided in the power consumption facility 20 such as the HPSes 21. Furthermore, the harmonics occurring in the power consumption facility 20 may not only stay in the power consumption facility 20 but also propagate to the power system 10. Here, the harmonic current of the high order group is less likely to propagate from the power consumption facility 20 to the power system 10 than the harmonic current of the low order group, and accordingly the harmonic current of the high order group is less likely to increase in the power system 10. Therefore, according to the present embodiment, the harmonic current of the high order group is not set as an adjustment target in the supply-side distribution line 14 and the reception-side distribution line 17. On the other hand, the harmonic current of the high order group may increase in the power consumption facility 20, and a device provided in the power consumption facility 20 may be affected by the harmonic current of the high order group. Therefore, in the in-facility electric line 202, the harmonic current of the high order group is set as an adjustment target.

However, in the supply-side distribution line 14 and the reception-side distribution line 17, too, the harmonic current of the high order group may be set as an adjustment target.

Furthermore, according to the present embodiment, "adjustment-needed order" and "other orders" are not provided in "low-order group harmonic" that is "adjustment target" of "electric line" of "202". However, "adjustment-needed order" and "other orders" may also be provided for "low-order group harmonic" that is "adjustment target" of "electric line" of "202".

Furthermore, in the relation management table, "priority order" indicates the priority order of the adjustment of each "adjustment target". According to the present embodiment, among "adjustment targets" indicated in the relation management table, "adjustment target" having a smaller value indicated in "priority order" is adjusted with a higher priority.

According to the present embodiment, "low-order group harmonic" of "adjustment-needed order" in "electric line" of "14" is set as "adjustment target" having "priority order" of "1". Further, "high-order group harmonic" in "electric line" of "202" is set as "adjustment target" having "priority order" of "2". Further, "fundamental" of "adjustment-needed power factor" in "electric line" of "14" is set as "adjustment target" having "priority order" of "3". Further, "low-order group harmonic" of "other orders" in "electric line" of "14" is set as "adjustment target" having "priority order" of "4". Further, "fundamental" of "other power factors" in "electric line" of "14" is set as "adjustment target" having "priority order" of "5". Further, "low-order group harmonic" of "adjustment-needed order" in "electric line" of "17" is set as "adjustment target" having "priority order" of "6". Further, "fundamental" of "adjustment-needed power factor" in "electric line" of "17" is set as "adjustment target" having "priority order" of "7". Further, "low-order group harmonic" of "other orders" in "electric line" of "17" is set as "adjustment target" having "priority order" of "8". Further, "fundamental" of "other power factors" in "electric line" of "17" is set as "adjustment target" having "priority order" of "9". Further, "fundamental" of "adjustment-needed power factor" in "electric line" of "202" is set as "adjustment target" having "priority order" of "10". Further, "low-order group harmonic" in "electric line" of "202" is set as "adjustment target" having "priority order" of "11". Further, "fundamental" of "other power factors" in "electric line" of "202" is set as "adjustment target" having "priority order" of "12".

The user of the power control system 1 inputs each "adjustment target" and each "priority order" to the control server 30. Each "adjustment target" and each "priority order" input to the control server 30 are written in the relation management table of the storage unit 302.

The relation of adjustment by the HPS 21 for "adjustment target" indicated in the relation management table will be described in detail.

It is determined that "adjustment target" in the supply-side distribution line 14 is adjusted in preference to "adjustment target" in the reception-side distribution line 17.

Due to the failure occurring in the apparent power in the reception-side distribution line 17, a failure may also occur in the apparent power in the supply-side distribution line 14 coupled to the reception-side distribution line 17 in which the failure has occurred. Even in this case, when the apparent power in the supply-side distribution line 14 is improved by the adjustment using the HPS 21, the apparent power may be improved not only in the supply-side distribution line 14 but also in the reception-side distribution line 17 where the failure has occurred. For example, as the power factor in the supply-side distribution line 14 is improved, the power factor in the reception-side distribution line 17 may also be improved. Furthermore, as another example, as the harmonic current of a specific order in the supply-side distribution line 14 is reduced, the harmonic current of the specific order in the reception-side distribution line 17 may also be reduced. In other words, when the apparent power in a specific adjustment target electric line is improved, the apparent power in a facility provided closer to the power reception side than the specific adjustment target electric line may also be improved. Therefore, according to the present embodiment, it is determined that the apparent power in the supply-side distribution line 14 is adjusted in preference to the apparent power in the reception-side distribution line 17.

Furthermore, according to the present embodiment, it is determined that "low-order group harmonic" of "adjustment-needed order" in the supply-side distribution line 14 is adjusted with the highest priority among "adjustment targets" indicated in the relation management table.

According to the present embodiment, the harmonic current of "adjustment-needed order" in the low order group is determined as a harmonic current that more easily affects the electric line than the harmonic current of an order different from "adjustment-needed order" or the power factor in the electric line. Therefore, it is determined that "low-order group harmonic" of "adjustment-needed order" is adjusted with the highest priority among the "adjustment targets".

Further, according to the present embodiment, it is determined that the harmonic current of the low order group in the electric line is adjusted in preference to the fundamental current in the electric line. For example, it is determined that "low-order group harmonic" of "other orders" in the supply-side distribution line 14 is adjusted in preference to "fundamental" of "other power factors" in the supply-side distribution line 14. Further, as another example, it is determined that "low-order group harmonic" of "other orders" in the reception-side distribution line 17 is adjusted in preference to "fundamental" of "other power factors" in the reception-side distribution line 17. Further, as another example, it is determined that "low-order group harmonic" in the in-facility electric line 202 is adjusted in preference to "fundamental" of "other power factors" in the in-facility electric line 202.

According to the present embodiment, the harmonic current of the low order group in the electric line is determined as the apparent power that more easily affects the electric line than the power factor in the electric line. Therefore, it is determined that the harmonic current of the low order group in the electric line is adjusted in preference to the fundamental current in the electric line.

Further, according to the present embodiment, it is determined that a specific fundamental current in the electric line is adjusted in preference to a harmonic current of the low order group in the electric line. For example, it is determined that "fundamental" of "adjustment-needed power factor" in the supply-side distribution line 14 is adjusted in preference to "low-order group harmonic" of "other orders" in the supply-side distribution line 14. Further, as another example, it is determined that "fundamental" of "adjustment-needed power factor" in the reception-side distribution line 17 is adjusted in preference to "low-order group harmonic" of "other orders" in the reception-side distribution line 17. Further, as another example, it is determined that "fundamental" of "adjustment-needed power factor" in the in-facility electric line 202 is adjusted in preference to "low-order group harmonic" in the in-facility electric line 202.

When the power factor in the electric line decreases, large power needs to be transmitted to the electric line to supply predetermined power from the power system 10 to the power consumption facility 20. Further, in this case, when the power more than the capacity of power in the electric line is transmitted to the electric line, there is a possibility that a failure occurs in the electric line. Therefore, according to the present embodiment, when the power factor in the electric line decreases to "adjustment-needed power factor", it is determined that "fundamental" of "adjustment-needed power factor" in the electric line is adjusted in preference to "low-order group harmonic" of "other orders" in the electric line. In this case, the occurrence of a failure in the electric line due to a decrease in the power factor in the electric line is suppressed.

Further, according to the present embodiment, it is determined that "high-order group harmonic" in the in-facility electric line 202 is adjusted in preference to "low-order group harmonic" and "fundamental" in the reception-side distribution line 17. In other words, when "high-order group harmonic" in the in-facility electric line 202 is adjusted, it is determined that the in-facility electric line 202 is adjusted in preference to the reception-side distribution line 17.

When the harmonic current of the high order group in the in-facility electric line 202 is adjusted, the HPS 21 that may be used for the adjustment is limited to the HPS 21 in the power consumption facility 20 where the in-facility electric line 202, which is an adjustment target, is provided. On the other hand, when the apparent power in the reception-side distribution line 17 is adjusted, the HPS 21 that may be used for the adjustment is each of the HPSes 21 in the power consumption facilities 20 that receive the power via the reception-side distribution line 17 that is an adjustment target. In other words, as compared with the HPS 21 used for adjusting the apparent power in the reception-side distribution line 17, the HPS 21 used for adjusting the harmonic current of the high order group in the in-facility electric line 202 is less likely to be replaced by the different HPS 21 for the adjustment. Therefore, according to the present embodiment, it is determined that the harmonic current of the high order group in the in-facility electric line 202 is adjusted in preference to the apparent power in the reception-side distribution line 17. This case prevents a failure to adjust the harmonic current of the high order group in the in-facility electric line 202 as the HPS 21 that may be used to adjust the in-facility electric line 202 is used to adjust the reception-side distribution line 17.

Further, according to the present embodiment, it is determined that "low-order group harmonic" and "fundamental" in the reception-side distribution line 17 are adjusted in preference to "low-order group harmonic" and "fundamental" in the in-facility electric line 202. In other words, when "high-order group harmonic" in the in-facility electric line 202 is not adjusted, the reception-side distribution line 17 is adjusted in preference to the in-facility electric line 202.

As the harmonic current of the low order group and the power factor in the reception-side distribution line 17 are improved, the harmonic current of the low order group and the power factor in the in-facility electric line 202, which receives the power via the reception-side distribution line 17, may also be improved. In this case, it is not necessary to supply the power from the HPS 21 to the in-facility electric line 202 to adjust the harmonic current of the low order group and the fundamental in the in-facility electric line 202.

Therefore, according to the present embodiment, when the harmonic current of the high order group in the in-facility electric line 202 is not adjusted, it is determined that the reception-side distribution line 17 is adjusted in preference to the in-facility electric line 202.

FIG. 7 is a diagram illustrating an HPS management table. The HPS management table is a table to manage the HPSes 21. The storage unit 302 of the control server 30 stores the HPS management table.

In the HPS management table, "HPS" indicates the HPS identification information. "A" to "L" accompanied with "21" of "HPS" are information for identifying the corresponding ones of the HPSes 21.

Furthermore, in the HPS management table, "pass-through electric line" indicates the electric line identification information. The electric line identification information indicated in "pass-through electric line" is the electric line identification information on the electric line that is passed through when the power is supplied from the power system 10 to "HPS". Furthermore, "pass-through electric line" indicates "reception-side distribution line" and "in-facility electric line". "A" and "B" accompanied with "17" of "reception-side distribution line" are information for identifying the corresponding ones of the reception-side distribution line 17A and the reception-side distribution line 17B. Further, "A" to "D" accompanied with "202" of "in-facility electric line" are information for identifying the corresponding ones of the in-facility electric lines 202.

For each of the HPSes 21, the user of the power control system 1 inputs, to the control server 30, the electric line identification information on the electric line that is passed through when the power is supplied to "HPS". When acquiring the electric line identification information input to the control server 30, the acquisition unit 301 writes the electric line identification information to the target "pass-through electric line".

Furthermore, in the HPS management table, "adjustable amount" indicates the adjustable amount calculated by the possible amount calculation unit 306 for "HPS". Each time the latest adjustable amount regarding the HPS 21 is calculated, the possible amount calculation unit 306 writes the calculated latest adjustable amount in "adjustable amount" associated with the target "HPS".

An example of the content of the HPS management table will be described. With "HPS" specified from "21A", "reception-side distribution line" of "17A" and "in-facility electric line" of "202A" are associated as "pass-through electric lines", and "10" is associated as "adjustable amount".

Figure 8:
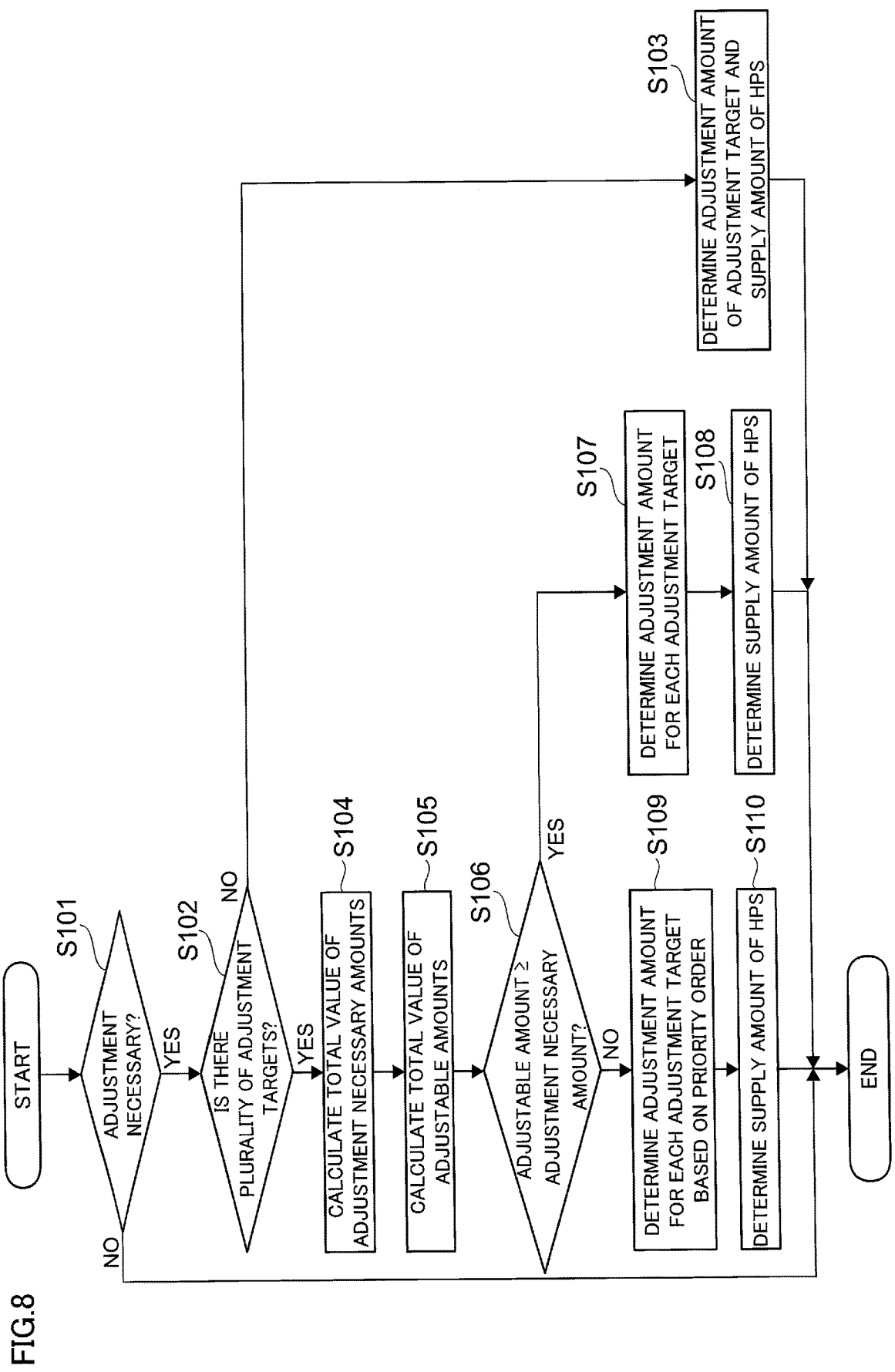
FIG. 8 is a flowchart illustrating a flow of an adjustment amount calculation process.

FIG. 8 is a flowchart illustrating a flow of an adjustment amount calculation process. The adjustment amount calculation process is a process in which the control server 30 calculates the adjustment amount. According to the present embodiment, the adjustment amount calculation process is started at predetermined time intervals. The predetermined time may be any time, but is for example one hour.

The target determination unit 303 determines whether the adjustment of the apparent power in the electric line is necessary (Step (hereinafter referred to as "S") 101). The target determination unit 303 refers to the electric line management table (see FIG. 5). Further, "power information" associated with "electric line" to be determined in the electric line management table is compared with "threshold" associated with the "electric line" so that it is determined whether the adjustment of the apparent power in "electric line" is necessary. Furthermore, when there is a plurality of pieces of power information that has not been used for the determination in Step 101, the target determination unit 303 makes a determination in Step 101 for each piece of power information. Moreover, when thresholds for a plurality of types of parameters regarding the apparent power are provided as "thresholds" in the electric line management table, the target determination unit 303 makes a determination in Step 101 for each type of parameter.

When the target determination unit 303 determines that there is no electric line for which the adjustment of the apparent power is necessary (NO in S101), the adjustment amount calculation process ends. In this case, the HPS 21 does not adjust the apparent power in the electric line.

Conversely, when there is an electric line for which the target determination unit 303 determines that the adjustment of the apparent power is necessary (YES in S101), the process proceeds to the subsequent step.

The target determination unit 303 determines whether there is a plurality of adjustment targets (S102). More specifically, the target determination unit 303 determines an adjustment target and determines whether there is a plurality of determined adjustment targets. When there is an adjustment target for each of the electric lines, the target determination unit 303 determines that there is a plurality of adjustment targets. Moreover, when there is a plurality of adjustment targets for one electric line, the target determination unit 303 determines that there is a plurality of adjustment targets.

Further, when the adjustment target is a harmonic current, the target determination unit 303 specifies the order of the harmonic current that is the adjustment target. Moreover, when the adjustment target is the fundamental current in the adjustment target electric line, the target determination unit 303 specifies the power factor in the adjustment target electric line.

When the target determination unit 303 determines that there is one adjustment target (NO in S102), the necessary amount calculation unit 304 calculates the adjustment necessary amount for the one adjustment target.

An example of the technique for calculating the adjustment necessary amount by the necessary amount calculation unit 304 will be described. The necessary amount calculation unit 304 calculates a larger adjustment necessary amount as there is a larger difference between the parameter of the adjustment target specified from "power information" associated with the adjustment target electric line and "threshold" related to the adjustment target in the electric line management table (see FIG. 5).

Further, the adjustment amount calculation unit 307 determines that the adjustment necessary amount calculated by the necessary amount calculation unit 304 is the adjustment amount for the adjustment target. Further, the supply amount of the HPS 21 used for the adjustment is determined so that the determined adjustment amount is supplied to the adjustment target electric line (S103).

Conversely, when the target determination unit 303 determines that there is a plurality of adjustment targets (YES in S102), the necessary amount calculation unit 304 calculates the adjustment necessary amount for each adjustment target. Further, the necessary amount calculation unit 304 calculates the total value of the calculated adjustment necessary amounts (S104).

The possible amount calculation unit 306 calculates the total value of the adjustable amounts for the respective HPSes 21 that may be used for the adjustment of the adjustment target (S105). More specifically, the possible amount calculation unit 306 calculates the total value of the adjustable amounts for the respective HPSes 21 extracted by the extraction unit 305 as the HPSes 21 that may be used for adjustment of the adjustment target. In this case, the extraction unit 305 extracts, as the HPS 21 that may be used for the adjustment of the adjustment target, "HPS" for which the electric line identification information on the adjustment target electric line is associated with "pass-through electric line" in the HPS management table (see FIG. 7).

The adjustment amount calculation unit 307 determines whether the total value of the adjustable amounts is equal to or more than the total value of the adjustment necessary amounts (S106).

When the adjustment amount calculation unit 307 determines that the total value of the adjustable amounts is equal to or more than the total value of the adjustment necessary amounts (YES in S106), the adjustment amount calculation unit 307 determines that the adjustment necessary amount calculated by the necessary amount calculation unit 304 for each adjustment target is the adjustment amount for each adjustment target (S107). Further, the adjustment amount calculation unit 307 determines the supply amount of the HPS 21 used for the adjustment so that the determined adjustment amount is supplied to the adjustment target electric line (S108).

Furthermore, when it is determined that the total value of the adjustable amounts is less than the total value of the adjustment necessary amounts (NO in S106), the adjustment amount calculation unit 307 determines the adjustment amount for each adjustment target based on the priority order indicated in the relation management table for the adjustment of the adjustment targets (S109). Further, the adjustment amount calculation unit 307 determines the supply amount of the HPS 21 used for the adjustment so that the determined adjustment amount is supplied to the adjustment target electric line (S110).

Next, a specific example (a specific example 1) of the adjustment amount calculation process (see FIG. 8) will be described.

In the specific example 1, it is assumed that three adjustment targets are "low-order group harmonic" of "other orders" (see FIG. 6) in the reception-side distribution line 17A, "fundamental" of "other power factors" in the reception-side distribution line 17A, and "high-order group harmonic" in the in-facility electric line 202 "202A" (see FIG. 7). Further, it is assumed that the adjustment necessary amount for "low-order group harmonic" of "other orders" in the reception-side distribution line 17A is "30" and the adjustment necessary amount for "fundamental" of "other power factors" in the reception-side distribution line 17A is "30". Further, it is assumed that the adjustment necessary amount for "high-order group harmonic" in the in-facility electric line 202 "202A" is "20".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "30+30+20=80" (S104).

The possible amount calculation unit 306 calculates the total value of the adjustable amounts for the respective HPSes 21 that may be used for the adjustment (S105). As described above, the adjustment target electric lines are the reception-side distribution line 17A and the in-facility electric line 202 "202A". In this case, the extraction unit 305 extracts, as the candidate of the HPS 21 to be used for the adjustment, "HPS" for which the electric line identification information on any adjustment target electric line is associated with "pass-through electric line" in the HPS management table (see FIG. 7). In the specific example 1, the extraction unit 305 extracts, as the candidates of the HPSes 21 used for the adjustment, the HPSes 21 "21A", "21B", "21C", "21D", "21E", and "21F" which are associated with at least one of "17A" and "202A". Furthermore, the possible amount calculation unit 306 calculates the total value of the adjustable amounts for the respective HPSes 21 extracted by the extraction unit 305 as "10+10+10+10+10+10=60" from "adjustable amounts" indicated in the HPS management table (see FIG. 7) (S105).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on "priority order" indicated in the relation management table (see FIG. 6) (S109).

In the specific example 1, "adjustment target" associated with the highest "priority order" in the relation management table among the three adjustment targets is "high-order group harmonic" of "electric line" of "202". In this case, the adjustment amount calculation unit 307 adjusts "high-order group harmonic" in the in-facility electric line 202 "202A" with the highest priority among the three adjustment targets. More specifically, it is determined that the adjustment amount for "high-order group harmonic" in the in-facility electric line 202 "202A" is "20" that is the adjustment necessary amount.

Further, "adjustment target" associated with the second highest "priority order" in the relation management table among the three adjustment targets is "low-order group harmonic" of "other orders" in "electric line" of "17". In this case, the adjustment amount calculation unit 307 determines that the adjustment amount for "low-order group harmonic" of "other orders" in the reception-side distribution line 17A is "30" that is the adjustment necessary amount.

The adjustment amount for "high-order group harmonic" in "202A" and the adjustment amount for "low-order group harmonic" in the reception-side distribution line 17A are subtracted from "60", which is the total value of the adjustable amounts calculated by the possible amount calculation unit 306, to obtain the value "60−(20+30)=10". Furthermore, the adjustment necessary amount for "fundamental" of "other power factors" in "electric line" of "17", which is "adjustment target" associated with the lowest "priority order" in the relation management table among the three adjustment targets, is "30" as described above. In this case, the adjustment amount calculation unit 307 determines that the adjustment amount for "fundamental" of "other power factors" in the reception-side distribution line 17A is "10". In other words, the adjustment amount calculation unit 307 determines that the adjustment amount for "fundamental" of "other power factors" in the reception-side distribution line 17A is a value limited as compared with the adjustment necessary amount.

Furthermore, the adjustment amount calculation unit 307 determines the supply amount of the HPS 21 used for the adjustment so that each determined adjustment amount is supplied to the adjustment target electric line (S110).

In the specific example 1, the adjustment amount calculation unit 307 determines that each of the supply amounts for the HPSes 21 "21A" and "21B" is "10" that is the supply amount for adjusting "high-order group harmonic" in the in-facility electric line 202 "202A". Furthermore, it is determined that each of the supply amounts for the HPSes 21 "21C", "21D", and "21E" is "10" that is the supply amount for adjustment of "low-order group harmonic" of "other orders" in the reception-side distribution line 17A. Moreover, the adjustment amount calculation unit 307 determines that the supply amount for the HPS 21 "21F" is "10" that is the supply amount for adjustment of "fundamental" of "other power factors" in the reception-side distribution line 17A.

In this way, the relation of adjustment by the HPS 21 for each adjustment target is determined.

The transmission unit 308 of the control server 30 gives an instruction to the HPS 21, which is used for the adjustment, to adjust the apparent power in the adjustment target electric line. In this case, the transmission unit 308 transmits the supply amount information indicating the supply amount determined by the adjustment amount calculation unit 307, the electric line identification information for identifying the electric line to which the current is supplied, and the target identification information for identifying the type of adjustment target.

The HPS 21 receives, from the transmission unit 308, the instruction for adjusting the apparent power in the adjustment target electric line and acquires the supply amount information, the electric line identification information, and the target identification information. In this case, the HPS 21 supplies the current specified from the supply amount information to the adjustment target electric line specified from the electric line identification information. More specifically, the HPS 21 supplies, to the adjustment target electric line, the current having the waveform for adjusting the adjustment target specified from the target identification information.

As described above, according to the present embodiment, the adjustment amount calculation unit 307 determines each adjustment amount for the harmonic current of the low order group in the adjustment target electric line, the harmonic current of the high order group in the adjustment target electric line, and the fundamental current in the adjustment target electric line. Further, the transmission unit 308 gives an instruction to the HPS 21 for the adjustment by the adjustment amount determined by the adjustment amount calculation unit 307. In other words, the adjustment amount calculation unit 307 sets the index regarding each adjustment for the harmonic component of the low order group in the current in the adjustment target electric line, the harmonic component of the high order group in the current in the adjustment target electric line, and the fundamental component in the current in the adjustment target electric line. Further, the transmission unit 308 controls the adjustment by the HPS 21 based on the index set by the adjustment amount calculation unit 307. Here, the transmission unit 308 may also be regarded as a control unit that controls the adjustment of the adjustment target by the HPS 21.

In this case, the HPS 21 adjusts the harmonic current of the high order group in the adjustment target electric line based on the adjustment amount set for the harmonic current of the high order group in the adjustment target electric line. Further, the HPS 21 adjusts the harmonic current of the low order group in the adjustment target electric line based on the adjustment amount set for the harmonic current of the low order group in the adjustment target electric line. Therefore, it is possible to achieve the adjustment of the adjustment target electric line based on the indexes set separately for the harmonic components having different orders in the current in the adjustment target electric line.

Furthermore, according to the present embodiment, the necessary amount calculation unit 304 calculates the adjustment necessary amount for the plurality of adjustment target electric lines based on the respective pieces of power information on the plurality of adjustment target electric lines. Further, the adjustment amount calculation unit 307 determines the adjustment amounts for the plurality of adjustment target electric lines based on the adjustment necessary amounts calculated by the necessary amount calculation unit 304. In other words, the adjustment amount calculation unit 307 sets the index regarding the adjustment for the plurality of adjustment target electric lines based on the power information on the plurality of adjustment target electric lines.

In this case, it is possible to achieve the adjustment of the plurality of adjustment target electric lines based on the indexes set separately for the harmonic components having different orders for the respective adjustment target electric lines.

Furthermore, in the specific example 1, the adjustment amount calculation unit 307 calculates the adjustment amount for the harmonic current of the low order group, the adjustment amount for the harmonic current of the high order group, and the adjustment amount for the fundamental current for the two adjustment target electric lines as targets, but is not limited thereto.

The target electric line for which the adjustment amount for the harmonic current of the low order group is calculated, the target electric line for which the adjustment amount for the harmonic current of the high order group is calculated, and the target electric line for which the adjustment amount for the fundamental current is calculated may be one adjustment target electric line or may be three or more adjustment target electric lines.

Furthermore, in the specific example 1, the adjustment amount calculation unit 307 determines the adjustment amount for the harmonic current of the low order group in the reception-side distribution line 17A based on the power information on the reception-side distribution line 17A and determines the adjustment amount for the harmonic current of the high order group in the in-facility electric line 202 based on the power information on the in-facility electric line 202. In other words, according to the present embodiment, the adjustment amount calculation unit 307 determines an index for a harmonic component of the low order group in a first electric line based on the power information on the apparent power in the first electric line and determines an index for a harmonic component of the high order group in a second electric line based on the power information on the apparent power in the second electric line. Here, examples of the first electric line include the supply-side distribution line 14 and the reception-side distribution line 17. Further, the second electric line is an electric line provided closer to the power reception side than the first electric line. Examples of the second electric line include the in-facility electric line 202.

In this case, it is possible to adjust the harmonic current of the order for which the adjustment target is determined for each adjustment target electric line in accordance with the positional relationship between the adjustment target electric line and the HPS 21.

Next, another specific example (a specific example 2) of the adjustment amount calculation process (see FIG. 8) will be described.

In the specific example 2, it is assumed that three adjustment targets are "fundamental" of "other power factors" (see FIG. 6) in the supply-side distribution line 14A, "low-order group harmonic" of "other orders" in the reception-side distribution line 17A, and "low-order group harmonic" in the in-facility electric line 202 "202A" (see FIG. 7). Further, it is assumed that the adjustment necessary amount for "fundamental" of "other power factors" in the supply-side distribution line 14A is "90" and the adjustment necessary amount for "low-order group harmonic" of "other orders" in the reception-side distribution line 17A is "30". Further, it is assumed that the adjustment necessary amount for "low-order group harmonic" in the in-facility electric line 202 "202A" is "10".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "90+30+10=130".

The possible amount calculation unit 306 calculates the total value of the adjustable amounts for the HPSes 21 that may be used for the adjustment (S105). As described above, the adjustment target electric lines are the supply-side distribution line 14A, the reception-side distribution line 17A, and the in-facility electric line 202 "202A". In this case, the extraction unit 305 extracts the twelve HPSes 21 from "21A" to "21L" that receive the power through the adjustment target electric lines as the candidates of the HPSes 21 to be used for the adjustment. As described above, when the adjustment target electric lines include the supply-side distribution line 14, the extraction unit 305 extracts all the HPSes 21 provided in the power control system 1. Furthermore, the possible amount calculation unit 306 calculates the total value of the adjustable amounts for the HPSes 21 to be used for the adjustment as "120" from "adjustable amounts" indicated in the HPS management table (see FIG. 7) (S105).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on the priority order indicated in the relation management table (see FIG. 6) (S109).

In the specific example 2, "adjustment target" associated with the highest "priority order" in the relation management table among the three adjustment targets is "fundamental" of "other power factors" in "electric line" of "14". In this case, the adjustment amount calculation unit 307 adjusts "fundamental" of "other power factors" in the supply-side distribution line 14A with the highest priority among the three adjustment targets. More specifically, the adjustment amount calculation unit 307 determines that the adjustment amount for "fundamental" of "other power factors" in the supply-side distribution line 14A is "90" that is the adjustment necessary amount.

Further, "adjustment target" associated with the second highest "priority order" in the relation management table among the three adjustment targets is "low-order group harmonic" of "other orders" in "electric line" of "17". In this case, the adjustment amount calculation unit 307 determines that the adjustment amount for "low-order group harmonic" of "other orders" in the reception-side distribution line 17A is "30" that is the adjustment necessary amount.

The adjustment amount for "fundamental" in the supply-side distribution line 14A and the adjustment amount for "low-order group harmonic" in the reception-side distribution line 17A are subtracted from "120", which is the total value of the adjustable amounts calculated by the possible amount calculation unit 306, to obtain the value "120−(90+30)=0". In this case, the adjustment amount calculation unit 307 determines "0" as the adjustment amount for "low-order group harmonic" in "202A" which is "adjustment target" associated with the lowest "priority order" in the relation management table among the three adjustment targets. In other words, the adjustment amount calculation unit 307 determines that the HPS 21 does not adjust "low-order group harmonic" in the in-facility electric line 202 "202A".

The adjustment amount calculation unit 307 determines the supply amount of the HPS 21 used for the adjustment so that the determined adjustment amount is supplied to the adjustment target electric line (S110).

In the specific example 2, the adjustment amount calculation unit 307 determines that each of the supply amounts for the HPSes 21 "21A", "21B", and "21C" is "10" that is the supply amount for the adjustment of "low-order group harmonic" of "other orders" in the reception-side distribution line 17A. Furthermore, the adjustment amount calculation unit 307 determines that each of the supply amounts for the HPSes 21 "21D", "21E", "21F", "21G", "21H", "21I", "21J", "21K", and "21L" is "10" that is the supply amount for the adjustment of "fundamental" of "other power factors" in the supply-side distribution line 14A.

In this way, the relation of adjustment by the HPS 21 for each adjustment target is determined.

Furthermore, in the above-described example, the adjustment amount calculation unit 307 may determine that each of the supply amounts for the HPSes 21 "21A", "21B", "21C", "21D", "21E", and "21F" is "10" that is the supply amount for adjusting the supply-side distribution line 14A. Further, in this case, as the HPSes 21 "21J", "21K", and "21L" cannot adjust the harmonic current in the reception-side distribution line 17A, the adjustment by the adjustment amount determined for the reception-side distribution line 17A is not achieved.

Therefore, according to the present embodiment, the adjustment amount calculation unit 307 first determines the supply amount for the electric line provided on the power reception side among the plurality of adjustment target electric lines for which the adjustment amount has been determined.

As described above, according to the present embodiment, the adjustment amount calculation unit 307 sets the index such that the second electric line is adjusted in preference to the first electric line when the HPS 21 adjusts the harmonic component of the high order group in the second electric line and sets the index such that the first electric line is adjusted in preference to the second electric line when the HPS 21 does not adjust the harmonic component of the low order group in the second electric line.

In this case, the adjustment target electric line to be preferentially adjusted may be determined based on whether the harmonic current of the high order group in the second electric line is adjusted.

Next, another specific example (a specific example 3) of the adjustment amount calculation process (see FIG. 8) will be described.

In the specific example 3, it is assumed that two adjustment targets are "low-order group harmonic" of "other orders" (see FIG. 6) in the supply-side distribution line 14B and "high-order group harmonic" in the in-facility electric line 202 "202D" (see FIG. 7). Furthermore, it is assumed that the adjustment necessary amount for "low-order group harmonic" of "other orders" in the supply-side distribution line 14B is "100" and the adjustment necessary amount for "high-order group harmonic" in the in-facility electric line 202 "202D" is "30".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "100+30=130" (S104).

The possible amount calculation unit 306 calculates the total value of the adjustable amounts for the HPSes 21 that may be used for the adjustment (S105). As described above, the adjustment target electric lines are the supply-side distribution line 14B and the in-facility electric line 202 "202D". In this case, the extraction unit 305 extracts the twelve HPSes 21 from "21A" to "21L" that receive the power through the adjustment target electric lines as the candidates of the HPSes 21 to be used for the adjustment. Furthermore, the possible amount calculation unit 306 calculates the total value of the adjustable amounts for the HPSes 21 to be used for the adjustment as "120" from "adjustable amounts" indicated in the HPS management table (see FIG. 7) (S105).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on "priority order" indicated in the relation management table (see FIG. 6) (S109).

In the specific example 3, "adjustment target" associated with the highest "priority order" between the two adjustment targets in the relation management table is "high-order group harmonic" of "electric line" of "202". In this case, the adjustment amount calculation unit 307 adjusts "high-order group harmonic" in the in-facility electric line 202 "202D" between the two adjustment targets with the highest priority. More specifically, it is determined that the adjustment amount for "high-order group harmonic current" in the in-facility electric line 202 "202D" is "30" that is the adjustment necessary amount.

The adjustment amount for "high-order group harmonic" in the in-facility electric line 202 "202D" is subtracted from "120", which is the total value of the adjustable amounts calculated by the possible amount calculation unit 306, to obtain the value "120−30=90". Furthermore, the adjustment necessary amount for "low-order group harmonic" of "other orders" in "electric line" of "14", which is "adjustment target" associated with the lower "priority order" between the two adjustment targets in the relation management table, is "100" as described above. In this case, the adjustment amount calculation unit 307 determines that the adjustment amount for "low-order group harmonic" of "other orders" in the supply-side distribution line 14B is "90" that is smaller than the adjustment necessary amount.

Furthermore, the adjustment amount calculation unit 307 determines the supply amount of the HPS 21 used for the adjustment so that each determined adjustment amount is supplied to the adjustment target electric line (S110).

In the above-described example, the adjustment amount calculation unit 307 determines that each of the supply amounts for the HPSes 21 "21J", "21K", and "21L" is "10" that is the supply amount for the adjustment of "high-order group harmonic" in "202D". Furthermore, it is determined that each of the supply amounts for the HPSes 21 "21A", "21B", "21C", "21D", "21E", "21F", "21G", "21H", and "21I" is "10" that is the supply amount for the adjustment of "low-order group harmonic" of "other orders" in the supply-side distribution line 14B.

In this way, the relation of adjustment by the HPS 21 for each adjustment target is determined.

As described above, according to the present embodiment, the adjustment amount calculation unit 307 sets the index such that the harmonic component of the high order group is adjusted in preference to the harmonic component of the low order group.

In this case, the harmonic current to be preferentially adjusted may be determined in accordance with the order of the harmonic current to be adjusted.

Next, another specific example (a specific example 4) of the adjustment amount calculation process (see FIG. 8) will be described.

In the specific example 4, it is assumed that two adjustment targets are "low-order group harmonic" of "adjustment-needed order" (see FIG. 6) in the supply-side distribution line 14B and "high-order group harmonic" in the in-facility electric line 202 "202D" (see FIG. 7). Furthermore, it is assumed that the adjustment necessary amount for "low-order group harmonic" of "adjustment-needed order" in the supply-side distribution line 14B is "100" and the adjustment necessary amount for "high-order group harmonic" in the in-facility electric line 202 "202D" is "30".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "100+30=130" (S104).

The possible amount calculation unit 306 calculates the total value of the adjustable amounts for the HPSes 21 that may be used for the adjustment (S105). As described above, the adjustment target electric lines are the supply-side distribution line 14B and the in-facility electric line 202 "202D". In this case, the extraction unit 305 extracts the twelve HPSes 21 from "21A" to "21L" that receive the power through the adjustment target electric lines as the candidates of the HPSes 21 to be used for the adjustment. Furthermore, the possible amount calculation unit 306 calculates the total value of the adjustable amounts for the HPSes 21 to be used for the adjustment as "120" from "adjustable amounts" indicated in the HPS management table (see FIG. 7) (S105).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on "priority order" indicated in the relation management table (see FIG. 6) (S109).

In the specific example 4, "adjustment target" associated with the highest "priority order" between the two adjustment targets in the relation management table is "low-order group harmonic" of "adjustment-needed order" of "electric line" of "14". In this case, the adjustment amount calculation unit 307 adjusts "low-order group harmonic" of "adjustment-needed order" in the supply-side distribution line 14B between the two adjustment targets with the highest priority. More specifically, it is determined that the adjustment amount for "low-order group harmonic" of "adjustment-needed order" in the supply-side distribution line 14B is "100" that is the adjustment necessary amount.

The adjustment amount for "low-order group harmonic" in the supply-side distribution line 14B is subtracted from "120", which is the total value of the adjustable amounts calculated by the possible amount calculation unit 306, to obtain the value "120−100=20". Further, the adjustment necessary amount for "high-order group harmonic" of "electric line" of "202D", which is "adjustment target" associated with the lower "priority order" between the two adjustment targets in the relation management table, is "30" as described above. In this case, the adjustment amount calculation unit 307 determines that the adjustment amount for "high-order group harmonic" in the in-facility electric line 202 "202D" is "20" that is smaller than the adjustment necessary amount.

Furthermore, the adjustment amount calculation unit 307 determines the supply amount of the HPS 21 used for the adjustment so that each determined adjustment amount is supplied to the adjustment target electric line (S110).

In the above-described example, the adjustment amount calculation unit 307 determines that each of the supply amounts for the HPSes 21 "21K" and "21L" is "10" that is the supply amount for the adjustment of "high-order group harmonic" in "202D". Furthermore, it is determined that each of the supply amounts for the HPSes 21 "21A", "21B", "21C", "21D", "21E", "21F", "21G", "21H", "21I", and "21J" is "10" that is the supply amount for adjusting "low-order group harmonic" of "adjustment-needed order" in the supply-side distribution line 14B.

In this way, the relation of adjustment by the HPS 21 for each adjustment target is determined.

As described above, according to the present embodiment, when the HPS 21 adjusts the harmonic component of a predetermined order in the low order group, the adjustment amount calculation unit 307 sets the index such that the harmonic component of the low order group is adjusted in preference to the harmonic component of the high order group. Examples of the predetermined order include "adjustment-needed order" indicated in the relation management table (see FIG. 6).

In this case, the harmonic current to be preferentially adjusted may be determined in accordance with the order of the harmonic current of the low order group to be adjusted.

Furthermore, in the specific example 3 and the specific example 4, the adjustment amount calculation unit 307 sets the adjustment priority relation between the harmonic component of the low order group in the supply-side distribution line 14B and the harmonic component of the high order group in the in-facility electric line 202, but is not limited thereto.

The adjustment amount calculation unit 307 may set the adjustment priority relation between the harmonic component of the low order group in the specific in-facility electric line 202 and the harmonic component of the high order group in the specific in-facility electric line 202. In other words, the electric line for which the priority relation of the adjustment amounts is set between the harmonic component of the low order group and the harmonic component of the high order group may be one electric line or a plurality of electric lines.

Next, another specific example (a specific example 5) of the adjustment amount calculation process (see FIG. 8) will be described.

In the specific example 5, it is assumed that two adjustment targets are "low-order group harmonic" of "other orders" (see FIG. 6) in the supply-side distribution line 14A and "fundamental" of "other power factors" in the supply-side distribution line 14B. Further, it is assumed that the adjustment necessary amount for "low-order group harmonic" of "other orders" in the supply-side distribution line 14A is "70" and the adjustment necessary amount for "fundamental" of "other power factors" in the supply-side distribution line 14B is "60".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "70+60=130" (S104).

The possible amount calculation unit 306 calculates the total value of the adjustable amounts for the HPSes 21 that may be used for the adjustment (S105). As described above, the adjustment target electric lines are the supply-side distribution line 14A and the supply-side distribution line 14B. In this case, the extraction unit 305 extracts the twelve HPSes 21 from "21A" to "21L" that receive the power through the adjustment target electric lines as the candidates of the HPSes 21 to be used for the adjustment. Furthermore, the possible amount calculation unit 306 calculates the total value of the adjustable amounts for the HPSes 21 to be used for the adjustment as "120" from "adjustable amounts" indicated in the HPS management table (see FIG. 7) (S105).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on "priority order" indicated in the relation management table (see FIG. 6) (S109).

In the specific example 5, "adjustment target" associated with the higher "priority order" between the two adjustment targets in the relation management table is "low-order group harmonic" of "other orders" in "electric line" of "14". In this case, the adjustment amount calculation unit 307 adjusts "low-order group harmonic" of "other orders" in the supply-side distribution line 14A with the highest priority between the two adjustment targets. More specifically, it is determined that the adjustment amount for "low-order group harmonic" of "other orders" in the supply-side distribution line 14A is "70" that is the adjustment necessary amount.

The adjustment amount for "low-order group harmonic" in the supply-side distribution line 14A is subtracted from "120", which is the total value of the adjustable amounts calculated by the possible amount calculation unit 306, to obtain the value "120−70=50". Furthermore, the adjustment necessary amount for "fundamental" of "other power factors" in "electric line" of "14", which is "adjustment target" associated with the lower "priority order" between the two adjustment targets in the relation management table, is "60" as described above. In this case, the adjustment amount calculation unit 307 determines that the adjustment amount for "fundamental" of "other power factors" in the supply-side distribution line 14B is "50" that is smaller than the adjustment necessary amount.

Furthermore, the adjustment amount calculation unit 307 determines the supply amount of the HPS 21 used for the adjustment so that each determined adjustment amount is supplied to the adjustment target electric line (S110).

In the above-described example, the adjustment amount calculation unit 307 determines that each of the supply amounts for the HPSes 21 "21A", "21B", "21C", "21D", "21E", "21F", and "21G" is "10" that is the supply amount for the adjustment of "low-order group harmonic" of "other orders" in the supply-side distribution line 14A. Further, it is determined that each of the supply amounts for the HPSes 21 "21H", "21I", "21J", "21K", and "21L" is "10" that is the supply amount for adjustment of "fundamental" of "other power factors" in the supply-side distribution line 14B.

In this way, the relation of adjustment by the HPS 21 for each adjustment target is determined.

As described above, according to the present embodiment, when the power factor condition is satisfied, which is set for the power factor specified from the power information on the adjustment target electric line, the adjustment amount calculation unit 307 sets the index such that the harmonic component of the low order group is adjusted in preference to the fundamental component in the adjustment target electric line. Here, an example of the power factor condition is that the power factor specified from the power information corresponds to "other power factors" indicated in the relation management table (see FIG. 6).

In this case, it is possible to determine the adjustment target to be preferentially adjusted between the harmonic current in the adjustment target electric line and the fundamental current in the adjustment target electric line in accordance with the power factor in the adjustment target electric line.

Next, another specific example (a specific example 6) of the adjustment amount calculation process (see FIG. 8) will be described.

In the specific example 6, it is assumed that three adjustment targets are "low-order group harmonic" of "other orders" (see FIG. 6) in the supply-side distribution line 14A, "fundamental" of "adjustment-needed power factor" in the supply-side distribution line 14B, and "high-order group harmonic" in the in-facility electric line 202 "202B". Further, it is assumed that the adjustment necessary amount for "low-order group harmonic" of "other orders" in the supply-side distribution line 14A is "40" and the adjustment necessary amount for "fundamental" of "adjustment-needed power factor" in the supply-side distribution line 14B is "120". Further, it is assumed that the adjustment necessary amount for "high-order group harmonic" in the in-facility electric line 202 "202B" is "20".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "40+120+20=180".

The possible amount calculation unit 306 calculates the total value of the adjustable amounts for the HPSes 21 that may be used for the adjustment (S105). As described above, the adjustment target electric lines are the supply-side distribution line 14A, the supply-side distribution line 14B, and the in-facility electric line 202 "202B". In this case, the extraction unit 305 extracts the twelve HPSes 21 from "21A" to "21L" that receive the power through the adjustment target electric lines as the candidates of the HPSes 21 to be used for the adjustment. Furthermore, the possible amount calculation unit 306 calculates the total value of the adjustable amounts for the HPSes 21 to be used for the adjustment as "120" from "adjustable amounts" indicated in the HPS management table (see FIG. 7).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on the priority order indicated in the relation management table (see FIG. 6) (S109).

In the specific example 6, "adjustment target" associated with the highest "priority order" in the relation management table among the three adjustment targets is "high-order group harmonic" of "electric line" of "202". In this case, the adjustment amount calculation unit 307 adjusts "high-order group harmonic" in the in-facility electric line 202 "202B" among the three adjustment targets with the highest priority. More specifically, the adjustment amount calculation unit 307 determines that the adjustment amount for "high-order group harmonic" in the in-facility electric line 202 "202B" is "20" that is the adjustment necessary amount.

The adjustment amount for "high-order group harmonic" in the in-facility electric line 202 "202B" is subtracted from "120", which is the total value of the adjustable amounts calculated by the possible amount calculation unit 306, to obtain the value "120−20=100". Furthermore, the adjustment necessary amount for "fundamental" of "adjustment-needed power factor" in "electric line" of "14", which is "adjustment target" associated with the second highest "priority order" among the three adjustment targets in the relation management table is "120" as described above. In this case, the adjustment amount calculation unit 307 determines that the adjustment amount for "fundamental" of "adjustment-needed power factor" in the supply-side distribution line 14B is "100" that is smaller than the adjustment necessary amount. Further, the adjustment amount calculation unit 307 determines "0" as the adjustment amount for "low-order group harmonic" of "other orders" in "electric line" of "14" that is "adjustment target" associated with the lowest "priority order" among the three adjustment targets in the relation management table. In other words, the adjustment amount calculation unit 307 determines that the HPS 21 does not adjust "low-order group harmonic" of "other orders" in the supply-side distribution line 14A.

The adjustment amount calculation unit 307 determines the supply amount of the HPS 21 used for the adjustment so that the determined adjustment amount is supplied to the adjustment target electric line (S110).

In the above-described example, the adjustment amount calculation unit 307 determines that each of the supply amounts for the HPSes 21 "21D" and "21E" is "10" that is the supply amount for adjustment of "high-order group harmonic" in the in-facility electric line 202 "202B". Furthermore, the adjustment amount calculation unit 307 determines that each of the supply amounts for the HPSes 21 "21A", "21B", "21C", "21F", "21G", "21H", "21I", "21J", "21K", and "21L" is "10" that is the supply amount for adjustment of "fundamental" of "adjustment-needed power factor" in the supply-side distribution line 14B.

In this way, the relation of adjustment by the HPS 21 for each adjustment target is determined.

As described above, according to the present embodiment, when the power factor specified from the power information on the adjustment target electric line satisfies a predetermined priority condition, the adjustment amount calculation unit 307 sets the index such that the fundamental component in the adjustment target electric line is adjusted in preference to the harmonic component of the low order group. An example of the priority condition is that the power factor specified from the power information corresponds to "adjustment-needed power factor" indicated in the relation management table (see FIG. 6).

In this case, it is possible to determine the adjustment target to be preferentially adjusted between the harmonic current in the adjustment target electric line and the fundamental current in the adjustment target electric line in accordance with the power factor in the adjustment target electric line.

Furthermore, according to the present embodiment, even when the power factor specified from the power information on the adjustment target electric line satisfies the priority condition, the adjustment amount calculation unit 307 sets the index such that the harmonic component of the high order group is adjusted in preference to the fundamental component in the adjustment target electric line.

In this case, the adjustment priority relation between the harmonic current and the fundamental current may be determined in accordance with the order of the harmonic current to be adjusted.

Furthermore, in the specific examples 5 and 6, the adjustment amount calculation unit 307 sets the adjustment priority relation between the harmonic component of the low order group in the supply-side distribution line 14A and the fundamental component in the supply-side distribution line 14B based on the power information on the supply-side distribution line 14A and the power information on the supply-side distribution line 14B, but is not limited thereto.

The adjustment amount calculation unit 307 may set the adjustment priority relation between the harmonic component of the low order group in the specific adjustment target electric line and the fundamental component in the specific adjustment target electric line based on the power information on the specific adjustment target electric line. In other words, the electric line for which the priority relation of the adjustment amount is determined between the harmonic component of the low order group and the fundamental component may be one electric line or a plurality of electric lines.

Furthermore, in the specific example 6, the adjustment amount calculation unit 307 sets the adjustment priority relation among the harmonic component of the low order group in the supply-side distribution line 14A, the fundamental component in the supply-side distribution line 14B, and the harmonic component of the high order group in the in-facility electric line 202 based on the power information on the supply-side distribution line 14A, the power information on the supply-side distribution line 14B, and the power information on the in-facility electric line 202, but is not limited thereto.

Based on the power information on the specific adjustment target electric line and the power information on another adjustment target electric line different from the specific adjustment target electric line, the adjustment amount calculation unit 307 may set the adjustment priority relation among the harmonic component of the low order group in the specific adjustment target electric line, the fundamental component in the specific adjustment target electric line, and the harmonic component of the high order group in another adjustment target electric line.

Furthermore, the adjustment amount calculation unit 307 may set the adjustment priority relation among the harmonic component of the low order group in the specific adjustment target electric line, the fundamental component in the specific adjustment target electric line, and the harmonic component of the high order group in the specific adjustment target electric line based on the power information on the specific adjustment target electric line. In other words, the electric line for which the priority relation of the adjustment amount is determined among the harmonic component of the low order group, the fundamental component, and the harmonic component of the high order group may be one electric line or a plurality of electric lines.

MODIFICATION

Next, a modification of the adjustment relation for a plurality of adjustment targets will be described. Furthermore, the adjustment relation by the HPS 21 for the plurality of adjustment targets is not limited to the example described in the relation management table in FIG. 6.

FIG. 9 is a diagram illustrating a relation management table according to the modification. Furthermore, in the relation management table illustrated in FIG. 9, the description for the same configuration as that of the relation management table illustrated in FIG. 6 will be omitted.

In the relation management table illustrated in FIG. 9, "adjustment-needed order" and "other orders" are indicated in "low-order group harmonic" associated with "electric line" of "202".

Furthermore, in the relation management table illustrated in FIG. 9, "low-order group harmonic" of "adjustment-needed order" in "electric line" of "14" is set as "adjustment target" having "priority order" of "1". Further, "low-order group harmonic" of "adjustment-needed order" in "electric line" of "17" is set as "adjustment target" having "priority order" of "2". Further, "low-order group harmonic" of "adjustment-needed order" in "electric line" of "202" is set as "adjustment target" having "priority order" of "3". Further, "high-order group harmonic" in "electric line" of "202" is set as "adjustment target" having "priority order" of "4". Further, "fundamental" of "adjustment-needed power factor" in "electric line" of "14" is set as "adjustment target" having "priority order" of "5". Further, "low-order group harmonic" of "other orders" in "electric line" of "14" is set as "adjustment target" having "priority order" of "6". Further, "fundamental" of "other power factors" in "electric line" of "14" is set as "adjustment target" having "priority order" of "7". Further, "fundamental" of "adjustment-needed power factor" in "electric line" of "17" is set as "adjustment target" having "priority order" of "8". Further, "low-order group harmonic" of "other orders" in "electric line" of "17" is set as "adjustment target" having "priority order" of "9". Further, "fundamental" of "other power factors" in "electric line" of "17" is set as "adjustment target" having "priority order" of "10". Further, "fundamental" of "adjustment-needed power factor" in "electric line"

of "202" is set as "adjustment target" having "priority order" of "11". Further, "low-order group harmonic" of "other orders" in "electric line" of "202" is set as "adjustment target" having "priority order" of "12". Further, "fundamental" of "other power factors" in "electric line" of "202" is set as "adjustment target" having "priority order" of "13".

The adjustment relation by the HPS 21 for "adjustment target" indicated in the relation management table will be described in detail.

According to the modification, it is determined that the harmonic current of the high order group in the electric line is adjusted in preference to the harmonic current of the low order group in the electric line. For example, it is determined that "high-order group harmonic" in the in-facility electric line 202 is adjusted in preference to "low-order group harmonic" of "other orders" in the supply-side distribution line 14. Further, as another example, it is determined that "high-order group harmonic" in the in-facility electric line 202 is adjusted in preference to "low-order group harmonic" of "other orders" in the reception-side distribution line 17. Further, as another example, it is determined that "high-order group harmonic" in the in-facility electric line 202 is adjusted in preference to "low-order group harmonic" of "other orders" in the in-facility electric line 202.

Further, according to the modification, it is determined that the harmonic current of a specific order in the low order group in the electric line is adjusted in preference to the harmonic current of the high order group in the electric line. As an example, it is determined that "low-order group harmonic" of "adjustment-needed order" in the supply-side distribution line 14 is adjusted in preference to "high-order group harmonic" in the in-facility electric line 202. Further, as another example, it is determined that "low-order group harmonic" of "adjustment-needed order" in the reception-side distribution line 17 is adjusted in preference to "high-order group harmonic" in the in-facility electric line 202. Furthermore, as another example, it is determined that "low-order group harmonic" of "adjustment-needed order" in the in-facility electric line 202 is adjusted in preference to "high-order group harmonic" in the in-facility electric line 202.

Next, another specific example (a specific example 7) of the adjustment amount calculation process (see FIG. 8) will be described.

In the specific example 7, it is assumed that the adjustment amount calculation unit 307 determines the adjustment relation for a plurality of adjustment targets using the relation management table illustrated in FIG. 9. Further, in the specific example 7, it is assumed that the two adjustment targets are "high-order group harmonic" (see FIG. 9) in the in-facility electric line 202 "202C" and "low-order group harmonic" of "other orders" in the in-facility electric line 202 "202C". Further, it is assumed that the adjustment necessary amount for "high-order group harmonic" in the in-facility electric line 202 "202C" is "20" and the adjustment necessary amount for "low-order group harmonic" of "other orders" in the in-facility electric line 202 "202C" is "20".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "20+20=40" (S104).

The possible amount calculation unit 306 calculates the total value of the adjustable amounts for the HPSes 21 that may be used for the adjustment (S105). As described above, the adjustment target electric line is the in-facility electric line 202 "202C". In this case, the extraction unit 305 extracts the HPSes 21 "21G", "21H", and "21I", for which "202C" is associated with "pass-through electric line" in the HPS management table (see FIG. 7), as the candidates of the HPSes 21 to be used for the adjustment. Furthermore, the possible amount calculation unit 306 calculates the total value of the adjustable amounts for the HPSes 21 to be used for the adjustment as "30" from "adjustable amounts" indicated in the HPS management table (see FIG. 7) (S105).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on "priority order" indicated in the relation management table (see FIG. 9) (S109).

In the specific example 7, "adjustment target" associated with the higher "priority order" between the two adjustment targets in the relation management table is "high-order group harmonic" in "electric line" of "202". In this case, the adjustment amount calculation unit 307 preferentially adjusts "high-order group harmonic" in the in-facility electric line 202 "202C" between the two adjustment targets. More specifically, it is determined that the adjustment amount for "high-order group harmonic" in the in-facility electric line 202 "202C" is "20" that is the adjustment necessary amount.

The adjustment amount for "high-order group harmonic" in the in-facility electric line 202 "202C" is subtracted from "30", which is the total value of the adjustable amounts calculated by the possible amount calculation unit 306, to obtain the value "30−20=10". On the other hand, the adjustment necessary amount for "low-order group harmonic" of "other orders" in "202C", which is "adjustment target" associated with the lower "priority order" between the two adjustment targets in the relation management table, is "20" as described above. In this case, the adjustment amount calculation unit 307 determines that the adjustment amount for "low-order group harmonic" of "other orders" in the in-facility electric line 202 "202C" is "10" that is smaller than the adjustment necessary amount.

Furthermore, the adjustment amount calculation unit 307 determines the supply amount of the HPS 21 used for the adjustment so that each determined adjustment amount is supplied to the adjustment target electric line (S110).

In the above-described example, the adjustment amount calculation unit 307 determines that each of the supply amounts for the HPSes 21 "21G" and "21H" is "10" that is the supply amount for adjusting "high-order group harmonic" in the in-facility electric line 202 "202C". Further, the adjustment amount calculation unit 307 determines that the supply amount for the HPS 21 "21I" is "10" that is the supply amount for adjusting "low-order group harmonic" of "other orders" in the in-facility electric line 202 "202C".

In this way, the relation of adjustment by the HPS 21 for each adjustment target is determined.

As described above, according to the present embodiment, the adjustment amount calculation unit 307 sets the adjustment amount such that the harmonic current of the high order group in a specific adjustment target electric line is adjusted in preference to the harmonic current of the low order group in the specific adjustment target electric line.

Next, another specific example (a specific example 8) of the adjustment amount calculation process (see FIG. 8) will be described.

In the specific example 8, it is assumed that the adjustment amount calculation unit 307 determines the adjustment relation for a plurality of adjustment targets using the relation management table illustrated in FIG. 9. Furthermore, in the specific example 8, it is assumed that the two adjustment targets are "high-order group harmonic" (see FIG. 9) in the in-facility electric line 202 "202C" and "low-order group harmonic" of "adjustment-needed order" in the in-facility electric line 202 "202C". Furthermore, it is assumed that the adjustment necessary amount for "high-order group harmonic" in the in-facility electric line 202 of "202C" is "20" and the adjustment necessary amount for "low-order group harmonic" of "adjustment-needed order" in the in-facility electric line 202 "202C" is "20".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "20+20=40" (S104).

The possible amount calculation unit 306 calculates the total value of the adjustable amounts for the HPSes 21 that may be used for the adjustment (S105). In this case, the extraction unit 305 extracts the HPSes 21 "21G", "21H", and "21I", for which "202C" is associated with "pass-through electric line" in the HPS management table (see FIG. 7), as the candidates of the HPSes 21 to be used for the adjustment. Furthermore, the possible amount calculation unit 306 calculates the total value of the adjustable amounts for the HPSes 21 to be used for the adjustment as "30" from "adjustable amounts" indicated in the HPS management table (see FIG. 7) (S105).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on "priority order" indicated in the relation management table (see FIG. 9) (S109).

In the specific example 8, "adjustment target" associated with the higher "priority order" between the two adjustment targets in the relation management table is "low-order group harmonic" of "adjustment-needed order" in "electric line" of "202". In this case, the adjustment amount calculation unit 307 preferentially adjusts "low-order group harmonic" of "adjustment-needed order" in the in-facility electric line 202 "202C" between the two adjustment targets. More specifically, it is determined that the adjustment amount for "low-order group harmonic" of "adjustment-needed order" in the in-facility electric line 202 "202C" is "20" that is the adjustment necessary amount.

The adjustment amount for "low-order group harmonic" in the in-facility electric line 202 "202C" is subtracted from "30", which is the total value of the adjustable amounts calculated by the possible amount calculation unit 306, to obtain the value "30−20=10". On the other hand, the adjustment necessary amount for "high-order group harmonic" in the in-facility electric line 202 "202C", which is "adjustment target" associated with the lower "priority order" between the two adjustment targets in the relation management table is "20" as described above. In this case, the adjustment amount calculation unit 307 determines that the adjustment amount for "high-order group harmonic" in the in-facility electric line 202 "202C" is "10" that is smaller than the adjustment necessary amount.

Furthermore, the adjustment amount calculation unit 307 determines the supply amount of the HPS 21 used for the adjustment so that each determined adjustment amount is supplied to the adjustment target electric line (S110).

In the above-described example, the adjustment amount calculation unit 307 determines that each of the supply amounts for the HPSes 21 "21G" and "21H" is "10" that is the supply amount for adjusting "low-order group harmonic" of "adjustment-needed order" in the in-facility electric line 202 "202C". Further, the adjustment amount calculation unit 307 determines that the supply amount for the HPS 21 "21I" is "10" that is the supply amount for adjusting "high-order group harmonic" in the in-facility electric line 202 "202C".

In this way, the relation of adjustment by the HPS 21 for each adjustment target is determined.

As described above, according to the present embodiment, when the HPS 21 adjusts the harmonic current of a specific order in the low order group in a specific adjustment target electric line, the adjustment amount calculation unit 307 sets the adjustment amount such that the harmonic current of the low order group in the specific adjustment target electric line is adjusted in preference to the harmonic current of the high order group in the specific adjustment target electric line. Here, as described in the specific examples 7 and 8, the electric line for which the priority relation of the adjustment amount is determined between the harmonic component of the low order group and the harmonic component of the high order group may be one electric line.

Next, another specific example (a specific example 9) of the adjustment amount calculation process (see FIG. 8) will be described.

In the specific example 9, it is assumed that the adjustment amount calculation unit 307 determines the adjustment relation for a plurality of adjustment targets using the relation management table illustrated in FIG. 9. Further, in the specific example 9, it is assumed that four adjustment targets are "fundamental" of "other power factors" (see FIG. 9) in the supply-side distribution line 14A, "low-order group harmonic" of "other orders" in the reception-side distribution line 17A, and "low-order group harmonic" and "high-order group harmonic" of "adjustment-needed order" in the in-facility electric line 202 "202D". Furthermore, it is assumed that the adjustment necessary amount for "fundamental" of "other power factors" in the supply-side distribution line 14A is "90" and the adjustment necessary amount for "low-order group harmonic" of "other orders" in the reception-side distribution line 17A is "20". Furthermore, it is assumed that the adjustment necessary amount for "low-order group harmonic" of "adjustment-needed order" in the in-facility electric line 202 "202D" is "20" and the adjustment necessary amount for "high-order group harmonic" in the in-facility electric line 202 "202D" is "10".

The target determination unit 303 determines that the adjustment of the apparent power in the electric line is necessary (YES in S101) and determines that there is a plurality of adjustment targets (YES in S102).

The necessary amount calculation unit 304 calculates the total value of the adjustment necessary amounts for the respective adjustment targets (S104). In the above-described example, the necessary amount calculation unit 304 calculates the total value of the adjustment necessary amounts as "90+20+20+10=140".

The possible amount calculation unit 306 calculates the total value of the adjustable amounts for the HPSes 21 that may be used for the adjustment (S105). As described above, the adjustment target electric lines are the supply-side distribution line 14A, the reception-side distribution line 17A, and the in-facility electric lines 202 "202D". In this case, the extraction unit 305 extracts the twelve HPSes 21 from "21A" to "21L" that receive the power through the adjustment target electric lines as the candidates of the HPSes 21 to be used for the adjustment. Furthermore, the possible amount calculation unit 306 calculates the total value of the adjustable amounts for the HPSes 21 to be used for the adjustment as "120" from "adjustable amounts" indicated in the HPS management table (see FIG. 7).

The adjustment amount calculation unit 307 determines that the total value of the adjustable amounts is less than the total value of the adjustment necessary amounts (NO in S106).

The adjustment amount calculation unit 307 determines the adjustment amount for each adjustment target based on the priority order indicated in the relation management table (see FIG. 9) (S109).

In the specific example 9, "adjustment target" associated with the highest "priority order" among the four adjustment targets in the relation management table is "low-order group harmonic" of "adjustment-needed order" in the in-facility electric line 202 "202D". In this case, the adjustment amount calculation unit 307 adjusts "low-order group harmonic" of "adjustment-needed order" in the in-facility electric line 202 "202D" among the four adjustment targets with the highest priority. More specifically, the adjustment amount calculation unit 307 determines that the adjustment amount for "low-order group harmonic" of "adjustment-needed order" in the in-facility electric line 202 "202D" is "20" that is the adjustment necessary amount.

Furthermore, "adjustment target" associated with the second highest "priority order" among the four adjustment targets in the relation management table is "high-order group harmonic" in the in-facility electric line 202 "202D". In this case, the adjustment amount calculation unit 307 determines that the adjustment amount for "high-order group harmonic" in the in-facility electric line 202 "202D" is "10" that is the adjustment necessary amount.

Further, "adjustment target" associated with the third highest "priority order" among the four adjustment targets in the relation management table is "fundamental" of "other power factors" in "electric line" of "14". In this case, the adjustment amount calculation unit 307 determines that the adjustment amount for "fundamental" of "other power factors" in the supply-side distribution line 14A is "90" that is the adjustment necessary amount.

The adjustment amount for "fundamental" in the supply-side distribution line 14A and the adjustment amounts for "low-order group harmonic" and "high-order group harmonic" in the in-facility electric line 202 are subtracted from "120", which is the total value of the adjustable amounts calculated by the possible amount calculation unit 306, to obtain the value "120−(90+20+10)=0". In this case, the adjustment amount calculation unit 307 determines "0" as the adjustment amount for "low-order group harmonic" of "other orders" in "electric line" of "17" that is "adjustment target" associated with the lowest "priority order" among the four adjustment targets in the relation management table. In other words, the adjustment amount calculation unit 307 determines that the HPS 21 does not adjust "low-order group harmonic" of "other orders" in the reception-side distribution line 17A.

The adjustment amount calculation unit 307 determines the supply amount of the HPS 21 used for the adjustment so that the determined adjustment amount is supplied to the adjustment target electric line (S110).

In the specific example 9, the adjustment amount calculation unit 307 determines that each of the supply amounts for the HPSes 21 "21J" and "21K" is "10" that is the supply amount for adjusting "low-order group harmonic" of "adjustment-needed order" in the in-facility electric line 202 "202D". Further, the adjustment amount calculation unit 307 determines that the supply amount for the HPS 21 "21L" is "10" that is the supply amount for adjusting "high-order group harmonic" in the in-facility electric line 202 "202D". Further, the adjustment amount calculation unit 307 determines that each of the supply amounts for the HPSes 21 "21A", "21B", "21C", "21D", "21E", "21F", "21G", "21H", and "21I" is "10" that is the supply amount for adjusting "fundamental" of "other power factors" in the supply-side distribution line 14A.

In this way, the relation of adjustment by the HPS 21 for each adjustment target is determined.

As described above, in the specific example 9, the adjustment amount calculation unit 307 sets the adjustment amount for the harmonic component of the low order group in the first electric line based on the power information about the apparent power in the first electric line and sets the adjustment amount for the harmonic component of the high order group in the second electric line based on the power information about the apparent power in the second electric line. In this case, the first electric line is the reception-side distribution line 17A. Further, the second electric line is the in-facility electric line 202. Here, as described in the specific example 9, setting the adjustment amount includes setting the adjustment amount to "0". Moreover, as described in the specific example 9, when the adjustment amount calculation unit 307 sets the adjustment amount for the harmonic current of the low order group in the first electric line and sets the adjustment amount for the harmonic current of the high order group in the second electric line, the adjustment amount may set for the apparent power in the adjustment target electric line that is different from both the first electric line and the second electric line.

Furthermore, in the description according to the present disclosure, the adjustment target in the supply-side distribution line 14 is adjusted in preference to the adjustment target in the reception-side distribution line 17, but is not limited thereto.

The adjustment target in the reception-side distribution line 17 may be adjusted in preference to the adjustment target in the supply-side distribution line 14.

Furthermore, according to the present disclosure, in the relation management table (see FIGS. 6 and 9), "priority order" of a specific adjustment target differs depending on the type of "electric line", but is not limited thereto. Examples of the specific adjustment target include "low-order group harmonic" and "fundamental".

Here, as "priority order" of the specific "adjustment target", the same order may be set regardless of the type of "electric line".

Furthermore, the relation of adjustment by the HPS 21 for each of the adjustment targets is not limited to the example described in the relation management table.

As an example, it may be determined that "high-order group harmonic" in the in-facility electric line 202 is adjusted with the highest priority among the "adjustment targets" indicated in the relation management table.

Furthermore, in the description according to the present disclosure, the adjustment amount calculation unit 307 of the control server 30 puts a limitation on the adjustment by the HPS 21 to the adjustment target. Here, putting a limitation on the adjustment by the HPS 21 to the adjustment target includes causing the HPS 21 to supply a current smaller than the current necessary for improvement of the adjustment target. In other words, putting a limitation on the adjustment by the HPS 21 to the adjustment target is not limited to putting a limitation on the adjustment amount as compared with the result calculated by the necessary amount calculation unit 304. Further, putting a limitation on the adjustment to the adjustment target by the HPS 21 also includes not causing the HPS 21 to adjust the adjustment target.

Further, putting a limitation on the adjustment to the adjustment target by the HPS 21 also includes putting a limitation on the time of adjustment to the adjustment target by the HPS 21. An example of the time limitation may be that, in a case where the HPS 21 adjusts the adjustment target to which the adjustment limitation is not applied and the adjustment target to which the adjustment limitation is applied, after the HPS 21 adjusts the adjustment target to which the limitation is not applied, the HPS 21 adjusts the adjustment target to which the limitation is applied. In other words, putting a limitation on the adjustment to the adjustment target by the HPS 21 includes not only putting a limitation on the adjustment amount for the adjustment target but also putting a limitation on the adjustment to the adjustment target by the HPS 21 in any manner.

Furthermore, in the description according to the present disclosure, the adjustment amount calculation unit 307 determines the relation of adjustment by the HPS 21 for each of the adjustment targets. Further, the adjustment amount calculation unit 307 may determine the relation of adjustment by the one HPS 21 for a plurality of adjustment targets or may determine the relation of adjustment by the plurality of HPSes 21 for a plurality of adjustment targets. In other words, the one or more HPSes 21 may be used for adjustment of a plurality of adjustment targets.

Further, according to the present disclosure, the one HPS 21 adjusts one adjustment target, but is not limited thereto.

The control server 30 may cause the one HPS 21 to adjust a plurality of adjustment targets. Further, the control server 30 may cause the one HPS 21 to adjust an adjustment target related to a plurality of adjustment target electric lines. When the one HPS 21 adjusts an adjustment target related to a plurality of adjustment target electric lines, the transmission unit 308 transmits, to the one HPS 21, the supply amount information, the electric line identification information, and the target identification information for each of the adjustment target electric lines. Moreover, when the one HPS 21 adjusts a plurality of adjustment targets in one adjustment target electric line, the transmission unit 308 transmits, to the one HPS 21, the supply amount information and the target identification information for each adjustment target.

Further, according to the present disclosure, the control server 30 determines the adjustment target electric line and the adjustment target and calculates the adjustment necessary amount, but is not limited thereto.

The management server 40 may determine the adjustment target electric line and the adjustment target and calculate the adjustment necessary amount. More specifically, the management server 40 may acquire the power information from the power sensor 10S or the facility power sensor 20S and determine the adjustment target electric line and the adjustment target based on the acquired power information. Furthermore, the management server 40 may calculate the adjustment necessary amount for the adjustment target based on the power information. Moreover, the management server 40 may transmit, to the control server 30, the information including the information indicating the calculated adjustment necessary amount, the electric line identification information for identifying the adjustment target electric line, and the target identification information for identifying the adjustment target as the power information on the apparent power in the electric line.

Furthermore, in the description according to the present disclosure, the power control system 1 includes the management server 40 and the control server 30, but is not limited thereto. A single server provided in the power control system 1 may have the functions of the management server 40 and the control server 30. Moreover, the single server may determine the adjustment target, determine the relation of adjustment for the plurality of adjustment targets, and give an instruction to the HPS 21 to adjust the apparent power in the electric line.

Further, in the description according to the present disclosure, the control server 30 gives an instruction to the HPS 21 to adjust the apparent power in the electric line, but is not limited thereto. Another server different from the control server 30 may receive an instruction from the control server 30 to adjust the apparent power in the electric line and send the received instruction to the HPS 21.

Further, in the description according to the present disclosure, the target electric lines whose apparent power is to be adjusted by the HPS 21 are the supply-side distribution line 14, the reception-side distribution line 17, and the in-facility electric line 202, but is not limited thereto.

The target electric line whose apparent power is to be adjusted by the HPS 21 may be the transmission line 12, the coupling line 141, or the demander-side distribution line 19.

Furthermore, according to the present disclosure, the apparent power in the in-facility electric line 202 is set as an adjustment target in the power consumption facility 20, but is not limited thereto.

A parameter regarding the apparent power in the power reception facility 201 provided in the power consumption facility 20 may be set as an adjustment target.

Further, according to the present disclosure, the parameters indicated in the relation management table (see FIG. 6) are exemplified as adjustment targets, but is not limited thereto.

The adjustment target may be any of the parameters described above with regard to the apparent power.

Furthermore, in the example described according to the present disclosure, the parameters such as adjustment necessary amount, adjustable amount, adjustment amount, and supply amount are currents, but is not limited thereto. Each parameter may be any of the parameters described above with regard to the apparent power.

Furthermore, in the description according to the present disclosure, the adjustment amount calculation unit 307 determines the relation of adjustment between the adjustment targets based on the priority order set for the adjustment of the adjustment targets, but is not limited thereto.

The adjustment amount calculation unit 307 may determine the relation of adjustment between the adjustment targets based on the adjustment ratio set for the adjustment targets. As an example, the ratio between the adjustment amount for the harmonic current of the high order group in the in-facility electric line 202 and the adjustment amount for the fundamental current in the reception-side distribution line 17 may be set to 2:1. Further, the adjustment amount calculation unit 307 may determine the adjustment amount for the harmonic current of the high order group in the in-facility electric line 202 and the adjustment amount for the fundamental current in the reception-side distribution line 17 in accordance with the predetermined ratio of adjustment amounts. In other words, the technique by which the adjustment amount calculation unit 307 determines the relation of adjustment for a plurality of adjustment targets is not limited to the determination technique based on the priority order of adjustment, but may be any technique.

Furthermore, in the configuration according to the present disclosure, the control server 30 controls the operation of the HPS 21, but is not limited thereto.

For example, the HPS 21 may have the function of the control server 30. In other words, the HPS 21 may include the CPU 31 (see FIG. 2), the ROM 32, the RAM 33, the communication device 34, and the storage device 35 to perform various functions. Furthermore, the HPS 21 may have the functions of the acquisition unit 301, the storage unit 302, the target determination unit 303, the necessary amount calculation unit 304, the extraction unit 305, the possible amount calculation unit 306, the adjustment amount calculation unit 307, the transmission unit 308, and the like, of the control server 30. Furthermore, the HPS 21 may acquire the power information and determine the adjustment target based on the acquired power information. Furthermore, the HPS 21 may set each adjustment amount for the harmonic component of the low order group in the current in the adjustment target electric line, the harmonic component of the high order group in the adjustment target electric line, and the fundamental component in the adjustment target electric line based on the power information. Furthermore, the HPS 21 may supply the current used for each adjustment based on the set adjustment amount. Furthermore, the HPS 21 may determine the priority relation of adjustment for a plurality of adjustment targets or may put a limitation on the adjustment by the HPS 21 to the apparent power in the HPS 21.

Here, each of the above-described embodiments may be understood as below.

The adjustment amount calculation unit 307 of the power control system 1 according to the present embodiment sets an index regarding each adjustment for a harmonic component of a first order group in a current in an adjustment target electric line, a harmonic component of a second order group higher in order than the first order group in the current in the adjustment target electric line, and a fundamental component in the current in the adjustment target electric line. Further, the transmission unit 308 controls each adjustment by the HPS 21 based on the index set by the adjustment amount calculation unit 307. Examples of the first order group include a low order group. Furthermore, examples of the second order group include a high order group.

In this case, the HPS 21 adjusts the harmonic current of the high order group in the adjustment target electric line based on the adjustment amount set for the harmonic current of the high order group in the adjustment target electric line. Further, the HPS 21 adjusts the harmonic current of the low order group in the adjustment target electric line based on the adjustment amount set for the harmonic current of the low order group in the adjustment target electric line. Therefore, it is possible to achieve the adjustment of the adjustment target electric line based on the indexes set separately for the harmonic components having different orders in the current in the adjustment target electric line.

Further, according to the present embodiment, the adjustment amount calculation unit 307 sets the index regarding adjustment for a plurality of adjustment target electric lines based on the power information on the plurality of adjustment target electric lines.

In this case, it is possible to achieve the adjustment of the plurality of adjustment target electric lines based on the indexes set separately for the harmonic components having different orders for the respective adjustment target electric lines.

Furthermore, according to the present embodiment, the adjustment amount calculation unit 307 sets the index for the harmonic component of the low order group in the first electric line based on first power information on the apparent power in the first electric line and sets the index for the harmonic component of the high order group in the second electric line based on second power information on the apparent power in the second electric line.

In this case, it is possible to adjust the harmonic current of the order for which the adjustment target is determined for each adjustment target electric line in accordance with the positional relationship between the adjustment target electric line and the HPS 21.

Further, according to the present embodiment, the adjustment amount calculation unit 307 sets the index such that the second electric line is adjusted in preference to the first electric line when the HPS 21 adjusts the harmonic component of the high order group in the second electric line and sets the index such that the first electric line is adjusted in preference to the second electric line when the HPS 21 does not adjust the harmonic component of the low order group in the second electric line.

In this case, the adjustment target electric line to be preferentially adjusted may be determined based on whether the harmonic current of the high order group in the second electric line is adjusted.

Further, according to the present embodiment, the adjustment amount calculation unit 307 sets the index such that the harmonic component of the high order group is adjusted in preference to the harmonic component of the low order group.

In this case, the harmonic current to be preferentially adjusted may be determined in accordance with the order of the harmonic current to be adjusted.

Furthermore, according to the present embodiment, when the HPS 21 adjusts the harmonic component of a predetermined order in the low order group, the adjustment amount calculation unit 307 sets the index such that the harmonic component of the low order group is adjusted in preference to the harmonic component of the high order group.

In this case, the harmonic current to be preferentially adjusted may be determined in accordance with the order of the harmonic current of the low order group to be adjusted.

Further, according to the present embodiment, when the power factor condition is satisfied, which is set for the power factor specified from the power information on the adjustment target electric line, the adjustment amount calculation unit 307 sets the index such that the harmonic component of the low order group is adjusted in preference to the fundamental component in the adjustment target electric line.

In this case, it is possible to determine the adjustment target to be preferentially adjusted between the harmonic current in the adjustment target electric line and the fundamental current in the adjustment target electric line in accordance with the power factor in the adjustment target electric line.

Further, according to the present embodiment, when the power factor specified from the power information on the adjustment target electric line satisfies a predetermined priority condition, the adjustment amount calculation unit 307 sets the index such that the fundamental component in the adjustment target electric line is adjusted in preference to the harmonic component of the low order group.

In this case, it is possible to determine the adjustment target to be preferentially adjusted between the harmonic current in the adjustment target electric line and the fundamental current in the adjustment target electric line in accordance with the power factor in the adjustment target electric line.

Furthermore, according to the present embodiment, even when the power factor specified from the power information on the adjustment target electric line satisfies the priority condition, the adjustment amount calculation unit 307 sets the index such that the harmonic component of the high order group is adjusted in preference to the fundamental component in the adjustment target electric line.

In this case, the adjustment priority relation between the harmonic current and the fundamental current may be determined in accordance with the order of the harmonic current to be adjusted.

Furthermore, from another point of view, the HPS 21 according to the present embodiment sets the index regarding each adjustment for a harmonic component of a first order group in a current in an adjustment target electric line, a harmonic component of a second order group higher in order than the first order group in the current in the adjustment target electric line, and a fundamental component in the current in the adjustment target electric line. Further, the HPS 21 supplies the current used for each adjustment based on the index set by the HPS 21.

Even in this case, it is possible to achieve the adjustment of the adjustment target electric line based on the indexes set separately for the harmonic components having different orders in the current in the adjustment target electric line.

Furthermore, each configuration described above is not limited to the above-described embodiment and may be changed without departing from the spirit. In other words, it is understood that various changes may be made to forms and details without departing from the spirit and scope of the claims.

In addition to the configuration described above, a part of each configuration described above may be omitted, or other functions may be added to each configuration described above.

REFERENCE SIGNS LIST

1 Power control system, 10 Power system, 10S Power sensor, 11 Power plant, 14 Supply-side distribution line, 16 Reception-side substation, 17 Reception-side distribution line, 19 Demander-side distribution line, 20 Power consumption facility, 21 HPS, 30 Control server, 40 Management server, 214 AF

The invention claimed is:

1. A power control system that causes a device to adjust apparent power in an electric line, the power control system comprising:
   a setting unit that sets an index regarding each adjustment for a harmonic component of a first order group in a current in the electric line, a harmonic component of a second order group higher in order than the first order group in the current in the electric line, and a fundamental component in the current in the electric line; and
   a control unit that controls the each adjustment by the device based on the index set by the setting unit.

2. The power control system according to claim 1, further comprising an acquisition unit that acquires power information on the apparent power in the electric line, wherein
   the setting unit sets the index regarding adjustment for a plurality of electric lines based on the power information on the plurality of electric lines.

3. The power control system according to claim 2, wherein the device receives power supplied via an electric line,
   the plurality of electric lines includes a first electric line and a second electric line provided closer to a power reception side than the first electric line, and
   the setting unit sets the index for the harmonic component of the first order group in the first electric line based on first power information on apparent power in the first electric line and sets the index for the harmonic component of the second order group in the second electric line based on second power information on apparent power in the second electric line.

4. The power control system according to claim 3, wherein the setting unit sets the index such that the second electric line is adjusted in preference to the first electric line when the device adjusts the harmonic component of the second order group in the second electric line and sets the index such that the first electric line is adjusted in preference to the second electric line when the device does not adjust the harmonic component of the second order group in the second electric line.

5. The power control system according to claim 1, wherein the setting unit sets the index such that the harmonic component of the second order group is adjusted in preference to the harmonic component of the first order group.

6. The power control system according to claim 1, wherein when the device adjusts a harmonic component of a predetermined order in the first order group, the setting unit sets the index such that the harmonic component of the first order group is adjusted in preference to the harmonic component of the second order group.

7. The power control system according to claim 1, further comprising an acquisition unit that acquires power information on the apparent power in the electric line, wherein
   the setting unit sets the index such that the harmonic component of the first order group is adjusted in preference to the fundamental component in the electric line when a power factor condition is satisfied, which is set for a power factor specified from the power information on the electric line.

8. The power control system according to claim 1, further comprising an acquisition unit that acquires power information on the apparent power in the electric line, wherein
   the setting unit sets the index such that the fundamental component in the electric line is adjusted in preference to the harmonic component of the first order group when a power factor specified from the power information on the electric line satisfies a predetermined priority condition.

9. The power control system according to claim 8, wherein the setting unit sets the index such that the harmonic component of the second order group is adjusted in preference to the fundamental component in the electric line even when the power factor specified from the power information on the electric line satisfies the priority condition.

10. A device that adjusts apparent power in an electric line, comprising:
- a setting unit that sets an index regarding each adjustment for a harmonic component of a first order group in a current in the electric line, a harmonic component of a second order group higher in order than the first order group in the current in the electric line, and a fundamental component in the current in the electric line; and
- a supply unit that supplies a current used for the each adjustment based on the index set by the setting unit.

* * * * *